US011385559B2

(12) United States Patent
Kikuchi et al.

(10) Patent No.: US 11,385,559 B2
(45) Date of Patent: Jul. 12, 2022

(54) ELECTROCONDUCTIVE MEMBER, PROCESS CARTRIDGE, AND IMAGE FORMING APPARATUS

(71) Applicant: CANON KABUSHIKI KAISHA, Tokyo (JP)

(72) Inventors: Yuichi Kikuchi, Suntou-gun (JP); Satoru Nishioka, Suntou-gun (JP); Kenji Takashima, Yokohama (JP); Kazuhiro Yamauchi, Suntou-gun (JP); Masahiro Kurachi, Susono (JP); Takumi Furukawa, Susono (JP); Hiroaki Watanabe, Odawara (JP); Kenya Terada, Suntou-gun (JP); Yuya Tomomizu, Ichikawa (JP); Toshimitsu Nakazawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 17/072,463

(22) Filed: Oct. 16, 2020

(65) Prior Publication Data

US 2021/0033996 A1 Feb. 4, 2021

Related U.S. Application Data

(63) Continuation of application No. PCT/JP2019/016300, filed on Apr. 16, 2019.

(30) Foreign Application Priority Data

Apr. 18, 2018 (JP) ............................ JP2018-079952
Feb. 26, 2019 (JP) ............................ JP2019-032936
Mar. 29, 2019 (JP) ............................ JP2019-069097

(51) Int. Cl.
*G03G 21/16* (2006.01)
*G03G 15/02* (2006.01)
(Continued)

(52) U.S. Cl.
CPC ........... *G03G 15/0233* (2013.01); *C08K 3/04* (2013.01); *C08K 3/26* (2013.01); *C08L 19/00* (2013.01);
(Continued)

(58) Field of Classification Search
CPC ........... G03G 15/0233; G03G 15/1685; G03G 21/1814; C08K 3/04; C08K 3/26; C08L 19/00
See application file for complete search history.

(56) References Cited

U.S. PATENT DOCUMENTS 5,198,685 A 3/1993 Kitani et al.
6,697,587 B2 2/2004 Harada
(Continued)

FOREIGN PATENT DOCUMENTS

CN 101573666 A 11/2009
CN 102203682 A 9/2011
(Continued)

OTHER PUBLICATIONS

U.S. Appl. No. 17/065,258, Kohei Makisumi, filed Oct. 7, 2020.
(Continued)

*Primary Examiner* — Hoang X Ngo
(74) *Attorney, Agent, or Firm* — Venable LLP

(57) ABSTRACT

Provided is an electrophotographic electroconductive member including an electroconductive support and an electroconductive layer on the support, an electroconductive member is used, in which an electroconductive layer has a matrix comprising a first rubber, and domains dispersed in the matrix, the domains each comprising a second rubber and an electronic electroconductive agent, and for impedance measured by applying an AC voltage with an amplitude of 1 V to the electroconductive layer while varying frequencies between $1.0\times10^{-2}$ Hz to $1.0\times10^{7}$ Hz under a specific envi-
(Continued)

ronment, when a double logarithmic plot with a frequency on an abscissa and an impedance on an ordinate is obtained, a slope on a high frequency side is −0.8 or more and −0.3 or less, and the impedance a low frequency side is from $1.0\times10^3$ to $1.0\times10^7\Omega$.

14 Claims, 10 Drawing Sheets

(51) Int. Cl.

| | |
|---|---|
| ***C08K 3/04*** | (2006.01) |
| ***C08K 3/26*** | (2006.01) |
| ***C08L 19/00*** | (2006.01) |
| ***G03G 21/18*** | (2006.01) |

(52) U.S. Cl.
CPC ... *G03G 21/1814* (2013.01); *C08K 2003/265* (2013.01); *C08K 2201/001* (2013.01)

(56) References Cited

U.S. PATENT DOCUMENTS 6,810,225 B2 * 10/2004 Kitano ............... G03G 15/0291 399/176
7,693,457 B2 4/2010 Kuruma et al.
7,799,398 B2 9/2010 Nakamura et al.
7,835,669 B2 11/2010 Furukawa
7,962,068 B2 6/2011 Kuroda et al.
8,163,389 B2 4/2012 Hirakawa et al.
8,298,670 B2 10/2012 Muranaka et al.
8,426,090 B2 4/2013 Sakka
8,440,307 B2 5/2013 Nose et al.
8,445,113 B2 5/2013 Furukawa et al.
8,449,975 B2 5/2013 Hirakoso et al.
8,469,867 B2 6/2013 Kuroda et al.
8,481,167 B2 7/2013 Watanabe et al.
8,491,994 B2 7/2013 Harada et al.
8,501,312 B2 8/2013 Watanabe et al.
8,501,325 B2 8/2013 Tomomizu et al.
8,503,911 B2 8/2013 Suzumura et al.
8,503,916 B2 8/2013 Anan et al.
8,526,857 B2 9/2013 Tomomizu et al.
8,532,535 B2 9/2013 Nose et al.
8,538,298 B2 9/2013 Harada et al.
8,622,881 B1 1/2014 Harada et al.
8,628,854 B2 1/2014 Yamauchi et al.
8,660,472 B2 2/2014 Kurachi et al.
8,668,987 B2 3/2014 Yamauchi et al.
8,685,601 B2 4/2014 Nose et al.
8,715,830 B2 5/2014 Yamada et al.
8,741,523 B2 6/2014 Hori
8,750,762 B2 6/2014 Harada et al.
8,755,714 B2 6/2014 Nagamine et al.
8,771,818 B2 7/2014 Nishioka et al.
8,852,743 B2 10/2014 Kikuchi et al.
8,923,732 B2 12/2014 Harada et al.
8,991,053 B2 3/2015 Watanabe et al.
9,023,465 B2 5/2015 Yamada et al.
9,086,643 B2 7/2015 Kikuchi et al.
9,128,403 B2 9/2015 Yamauchi et al.
9,146,482 B2 9/2015 Watanabe et al.
9,360,789 B1 6/2016 Masu et al.
9,360,833 B2 6/2016 Terada et al.
9,372,428 B2 6/2016 Kuroda et al.
9,372,429 B2 6/2016 Watanabe et al.
9,442,408 B2 9/2016 Yamauchi et al.
9,442,451 B2 9/2016 Yamauchi et al.
9,541,854 B2 1/2017 Kikuchi et al.
9,547,250 B2 1/2017 Kikuchi et al.
9,551,949 B2 1/2017 Yamauchi et al.
9,556,359 B2 1/2017 Suzumura et al.
9,581,931 B2 2/2017 Yamada et al.
9,599,913 B2 3/2017 Nishioka et al.
9,639,009 B2 5/2017 Yamaguchi et al.
9,651,888 B2 5/2017 Muranaka et al.
9,665,028 B2 5/2017 Arimura et al.
9,665,029 B2 5/2017 Hino et al.
9,740,133 B2 8/2017 Yamauchi et al.
9,811,009 B2 11/2017 Yamada et al.
9,811,021 B2 11/2017 Muranaka et al.
9,897,931 B2 2/2018 Nishioka et al.
9,904,199 B2 2/2018 Terada et al.
9,910,379 B2 3/2018 Furukawa et al.
9,958,802 B2 5/2018 Kikuchi et al.
9,964,914 B2 5/2018 Arimura et al.
9,977,353 B2 5/2018 Nishioka et al.
10,018,927 B2 7/2018 Yamada et al.
10,018,934 B2 7/2018 Yamada et al.
10,108,129 B2 10/2018 Yamaguchi et al.
10,146,149 B2 12/2018 Watanabe et al.
10,280,148 B2 5/2019 Nishioka et al.
10,317,811 B2 6/2019 Tomomizu et al.
10,416,588 B2 9/2019 Masu et al.
10,545,453 B2 1/2020 Iwasaki et al.
10,558,136 B2 2/2020 Furukawa et al.
10,649,350 B2 5/2020 Yamaguchi et al.
10,663,913 B2 5/2020 Yamaai et al.
10,678,154 B2 6/2020 Takashima et al.
10,678,158 B2 6/2020 Kikuchi et al.
2006/0142131 A1 6/2006 Iwamura
2011/0013939 A1 * 1/2011 Ono .................. G03G 15/0233 399/176
2012/0076535 A1 3/2012 Nagamine et al.
2012/0237863 A1 9/2012 Wu
2012/0251171 A1 10/2012 Muranaka et al.
2012/0308261 A1 12/2012 Tsuru et al.
2013/0004206 A1 1/2013 Kuroda et al.
2013/0034369 A1 2/2013 Masu et al.
2013/0064571 A1 3/2013 Kodama et al.
2013/0281276 A1 10/2013 Watanabe et al.
2014/0072343 A1 3/2014 Masu et al.
2014/0080691 A1 3/2014 Kurachi et al.
2015/0331346 A1 11/2015 Yamauchi et al.
2020/0225593 A1 7/2020 Yamaguchi et al.
2020/0310264 A1 10/2020 Kurachi et al.
2020/0310265 A1 10/2020 Nishioka et al.
2020/0310266 A1 10/2020 Kikuchi et al.
2021/0026295 A1 1/2021 Yamada et al.
2021/0041796 A1 2/2021 Nishioka et al.

FOREIGN PATENT DOCUMENTS

CN 102221794 A 10/2011
EP 3648489 A1 7/2016
EP 3073324 A1 9/2016
JP 2002003651 A 1/2002
JP 2005321764 A 11/2005
JP 2006-36456 A 2/2006
JP 2008-292573 A 12/2008
JP 2012163954 A 8/2012
JP 2016018154 A 2/2016

OTHER PUBLICATIONS

U.S. Appl. No. 17/069,919, Tsutomu Nishida, filed Oct. 14, 2020.
U.S. Appl. No. 17/070,054, Yuka Ishiduka, filed Oct. 14, 2020.
U.S. Appl. No. 17/070,085, Fumiyuki Hiyama, filed Oct. 14, 2020.
U.S. Appl. No. 17/070,179, Kaname Watariguchi, filed Oct. 14, 2020.
U.S. Appl. No. 17/070,995, Tetsuo Hino, filed Oct. 15, 2020.
U.S. Appl. No. 17/071,103, Noriyoshi Umeda, filed Oct. 15, 2020.
U.S. Appl. No. 17/071,109, Shohei Kototani, filed Oct. 15, 2020.
U.S. Appl. No. 17/071,227, Kosuke Fukudome, filed Oct. 15, 2020.
U.S. Appl. No. 17/071,246, Tomohiro Unno, filed Oct. 15, 2020.
U.S. Appl. No. 17/071,283, Yoshitaka Suzumura, filed Oct. 15, 2020.
U.S. Appl. No. 17/071,535, Hiroyuki Tomono, filed Oct. 15, 2020.

(56) References Cited

OTHER PUBLICATIONS

U.S. Appl. No. 17/071,540, Tsuneyoshi Tominaga, filed Oct. 15, 2020.

* cited by examiner

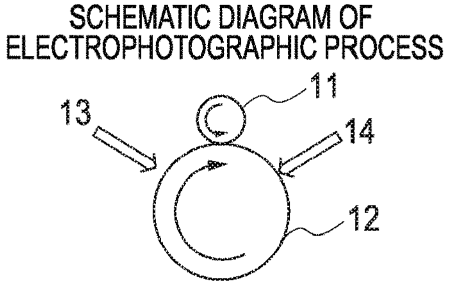

FIG. 1A
SCHEMATIC DIAGRAM OF ELECTROPHOTOGRAPHIC PROCESS

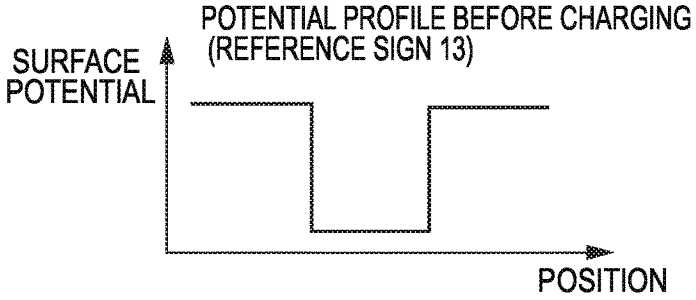

FIG. 1B

POTENTIAL PROFILE BEFORE CHARGING (REFERENCE SIGN 13)

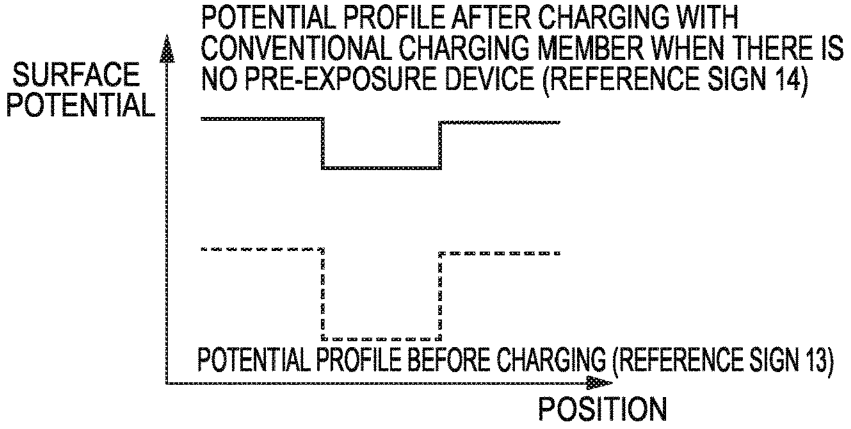

FIG. 1C

POTENTIAL PROFILE AFTER CHARGING WITH CONVENTIONAL CHARGING MEMBER WHEN THERE IS NO PRE-EXPOSURE DEVICE (REFERENCE SIGN 14)

POTENTIAL PROFILE BEFORE CHARGING (REFERENCE SIGN 13)

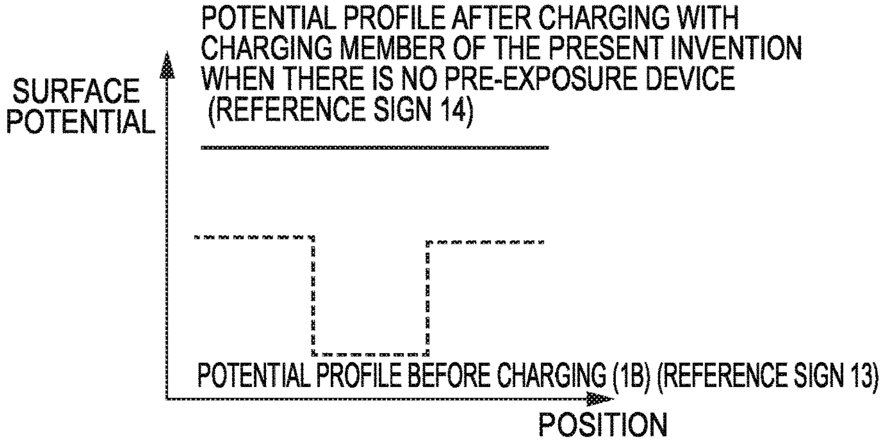

FIG. 1D

POTENTIAL PROFILE AFTER CHARGING WITH CHARGING MEMBER OF THE PRESENT INVENTION WHEN THERE IS NO PRE-EXPOSURE DEVICE (REFERENCE SIGN 14)

POTENTIAL PROFILE BEFORE CHARGING (1B) (REFERENCE SIGN 13)

ELECTROCONDUCTIVE MEMBER, PROCESS CARTRIDGE, AND IMAGE FORMING APPARATUS

CROSS-REFERENCE TO RELATED APPLICATIONS

This application is a Continuation of International Patent Application No. PCT/JP2019/016300, filed Apr. 16, 2019, which claims the benefit of Japanese Patent Application No. 2018-079952, filed Apr. 18, 2018, Japanese Patent Application No. 2019-032936, filed Feb. 26, 2019, and Japanese Patent Application No. 2019-069097, filed Mar. 29, 2019, all of which are hereby incorporated by reference herein in their entirety.

BACKGROUND

The present disclosure relates to an electrophotographic electroconductive member that can be used as a charging member, a developing member, or a transfer member in an electrophotographic image forming apparatus, a process cartridge, and the electrophotographic image forming apparatus.

DESCRIPTION OF THE RELATED ART

An electroconductive member such as a charging member, a transfer member, or a developing member has been used in an electrophotographic image forming apparatus. As the electroconductive member, an electroconductive member having an electroconductive support and an electroconductive layer on the support has been known.

The electroconductive member plays a role of transporting an electric charge from the electroconductive support to a surface of the electroconductive member and giving the electric charge to a contact object by discharging or triboelectric charging.

The charging member is a member that causes discharge between the charging member and an electrophotographic photoreceptor to charge a surface of the electrophotographic photoreceptor. The developing member is a member that controls the electric charge of a developer applied on the surface by triboelectric charging to give a uniform charge amount distribution, and then, uniformly transfers the developer to the surface of the electrophotographic photoreceptor according to the applied electric field. The transfer member is a member that transfers the developer from the electrophotographic photoreceptor to a print medium or an intermediate transfer member, and at the same time, generates the discharge to stabilize the transferred developer.

Each of these electroconductive members needs to achieve uniform charging with respect to a contact object such as an electrophotographic photoreceptor, an intermediate transfer member, or a printing medium.

Japanese Patent Application Laid-Open No. 2002-3651 discloses a rubber composition having a sea-island structure containing a polymer continuous phase formed of an ionic electroconductive rubber material mainly composed of a raw material rubber A having a volume resistivity of $1\times10^{12}$ Ω·cm or less, and a polymer particle phase formed of an electroconductive rubber material made electroconductive by blending electroconductive particles in a raw material rubber B, and a charging member having an elastic layer formed from the rubber composition.

According to the study by the present inventors, it was found that the charging member according to Japanese Patent Application Laid-Open No. 2002-3651 is excellent in uniform charging property with respect to a body to be charged. However, it has been recognized that there is still room for improvement in speeding up an image forming process in recent years. Specifically, when the charging member according to Japanese Patent Application Laid-Open No. 2002-3651 is subjected to the formation of an electrophotographic image, it is not possible to sufficiently level the minute potential unevenness formed on the surface of the body to be charged up to the charging step, and an electrophotographic image (hereinafter, also referred to as "ghost image") in which an image that is not supposed to be originally formed due to the potential unevenness is superimposed on the original image may be formed in some cases.

SUMMARY

One aspect of the present disclosure is directed to providing an electroconductive member that can be used as a charging member, a developing member, or a transfer member that can stably charge a body to be charged even when applied to a high-speed electrophotographic image forming process.

In addition, another aspect of the present disclosure is directed to providing a process cartridge that contributes to the formation of a high-quality electrophotographic image. Still another aspect of the present disclosure is directed to providing an electrophotographic image forming apparatus capable of forming a high-quality electrophotographic image.

According to one aspect of the present disclosure, there is provided an electrophotographic electroconductive member comprising: a support having an electroconductive outer surface; and an electroconductive layer on the electroconductive outer surface of the support, the electroconductive layer having a matrix comprising a first rubber, and domains dispersed in the matrix, the domains each comprising a second rubber and an electronic electroconductive agent, wherein assuming that a metal film is provided on an outer surface of the electroconductive member, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C. and a humidity of 50% RH, and a double logarithmic plot with a frequency on an abscissa and an impedance on an ordinate is obtained, a slope at frequencies of $1.0\times10^{5}$ Hz to $1.0\times10^{6}$ Hz is −0.8 or more and −0.3 or less, and the impedance at frequencies $1.0\times10^{-2}$ Hz to $1.0\times10^{1}$ Hz is $1.0\times10^{3}$ to $1.0\times10^{7}$Ω.

According to another aspect of the present disclosure, there is provided a process cartridge configured to be detachably attachable to a main body of an electrophotographic image forming apparatus, the process cartridge for electrophotography including the electroconductive member. According to still another aspect of the present disclosure, there is provided an electrophotographic image forming apparatus including the electroconductive member.

Further features of the present disclosure will become apparent from the following description of exemplary embodiments with reference to the attached drawings.

BRIEF DESCRIPTION OF THE DRAWINGS

FIG. 1A is an image view of surface potential unevenness.

FIG. 1B is an image view of the surface potential unevenness.

FIG. 1C is an image view of the surface potential unevenness.

FIG. 1D is an image view of the surface potential unevenness.

DESCRIPTION OF THE EMBODIMENTS

The present inventors presume that a charging member according to Japanese Patent Application Laid-Open No. 2002-3651 causes a ghost image as follows.

Figure 11:
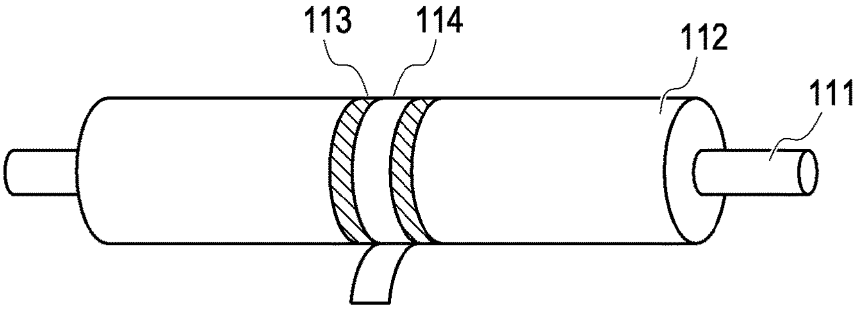
FIG. 11 is a schematic diagram of a state where a measurement electrode is formed on a charging roller.

A phenomenon in which a ghost image occurs will be described with reference to FIGS. 1A, 1B, 1C and 1D. In FIG. 1A, 11 represents a charging member, 12 represents a photosensitive drum, 13 represents a surface potential measuring unit before a charging process, and 14 represents a surface potential measuring unit after the charging process. Generally, the surface potential of the photosensitive drum that has undergone the transfer process has unevenness as illustrated in FIG. 1B. Therefore, the unevenness of the surface potential rushes into the charging process, and the charging potential unevenness as illustrated in FIG. 1C is formed according to the surface potential unevenness, thereby generating a ghost image. Here, as long as the charging member has a sufficient electric charge imparting ability to even out the surface potential unevenness, the ghost image does not occur.

However, it is considered that the charging member according to Japanese Patent Application Laid-Open No. 2002-3651 cannot sufficiently cope with the shortening of discharge interval for a body to be charged due to the speeding up of an electrophotographic image forming process. The mechanism is considered as follows.

Generally, in minute gaps in the vicinity of a contact portion between the charging member and the photosensitive drum, discharge occurs in a region where the relationship between the strength of an electric field and the distance between the minute gaps satisfies Paschen's law. In an electrophotographic process in which a photosensitive drum rotates and discharge is generated, it has been found that when one point on the surface of the charging member is traced over time, the discharge does not occur continuously from a discharge start point to a discharge end point, and multiple discharges occur repeatedly. The present inventors have measured and analyzed a discharge state of the charging member according to Japanese Patent Application Laid-Open No. 2002-3651 in detail in a high-speed process using an oscilloscope. In the charging member according to Japanese Patent Application Laid-Open No. 2002-3651, the timing at which high-frequency discharge is unlikely to occur in a charging process portion, that is, a phenomenon in which discharge omission occurs has been obtained. It is presumed that this is a result that the total discharge amount decreases due to the occurrence of discharge omission, and the unevenness of the surface potential cannot be offset.

Figure 2A:
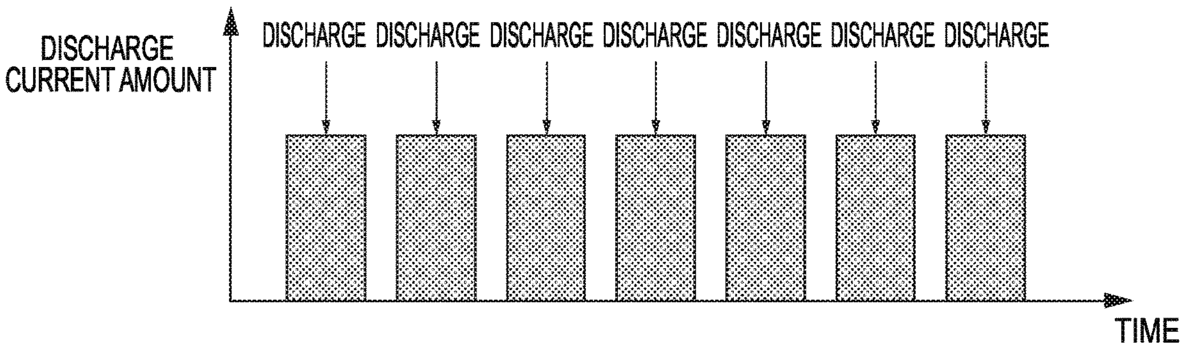
FIG. 2A is an image view of discharge omission.
Figure 2B:
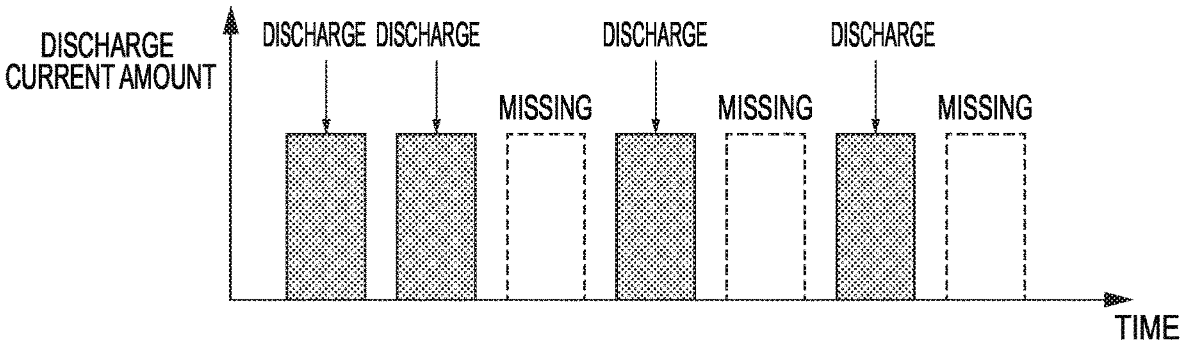
FIG. 2B is an image view of the discharge omission.

FIG. 2A and FIG. 2B are image diagrams of a state in which discharge omission occurs. FIG. 2A illustrates a state in which there is no discharge omission and the total amount of discharge is satisfied, and FIG. 2B illustrates a state in which the discharge omission occurs and the total amount of discharge is insufficient.

It is presumed that the reason for the occurrence of the discharge omission is that on the surface of the charging member, the supply of electric charge for the subsequent discharge cannot follow after the discharge has occurred and the electric charge is consumed.

Therefore, on the surface of the charging member, in order to quickly supply the next electric charge after the discharge has occurred and the electric charge is consumed, the discharge frequency may be improved to suppress the discharge omission.

Here, the present inventors consider that it is not sufficient to speed up the cycle of charging the electric charge inside the charging member. In other words, on the surface of the electroconductive member, the discharge omission can be suppressed by speeding up the cycle of electric charge consumption due to the discharge and electric charge supply. However, in a case where the amount of electric charge that can contribute to this cycle is reduced by the amount of time required for the cycle being shortened, a single discharge amount is reduced, and the total amount of discharge does not reach a level that evens out the surface potential unevenness. Therefore, it was considered necessary not only to suppress the discharge omission, that is, to improve the frequency of the discharge, but at the same time to improve the generation amount of a single discharge.

Therefore, the present inventors have made extensive studies to obtain an electroconductive member capable of accumulating sufficient electric charges in a short time and promptly releasing the electric charges. As a result, it has been found that the electroconductive member having the following configuration can meet the above requirements well.

The electroconductive member includes a support having an electroconductive outer surface and an electroconductive layer on the electroconductive outer surface of the support, the electroconductive layer includes a matrix comprising a first rubber, and domains dispersed within the matrix, and the domains include a second rubber and an electronic electroconductive agent. Assuming that a metal film is provided on an outer surface of the electroconductive member, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C. and a humidity of 50% RH, and a double logarithmic plot with a frequency on an abscissa and an impedance on an ordinate is obtained, both the following first requirement and second requirement are satisfied.

<First Requirement>

The slope at frequencies from $1.0\times10^5$ Hz to $1.0\times10^6$ Hz is −0.8 or more and −0.3 or less.

<Second Requirement>

The impedance at frequencies from $1.0\times10^{-2}$ Hz to $1.0\times10^1$ Hz is from $1.0\times10^3$ to $1.0\times10^7\Omega$.

With the electroconductive member according to this aspect, it is possible to form a uniform charging potential profile as illustrated in FIG. 1D without using a pre-exposure device for evening out the surface potential unevenness.

Hereinafter, the electroconductive member according to this aspect will be described with reference to an aspect for a charging member as an example. The electroconductive member according to this aspect is not limited to the use as a charging member, and may be applied to, for example, a developing member or a transfer member.

The electroconductive member according to this aspect includes a support having an electroconductive outer surface, and an electroconductive layer on the electroconductive outer surface of the support. The electroconductive layer has electroconductivity. Here, the electroconductivity is defined as a volume resistivity of less than $1.0\times10^8$ Ω·cm. In addition, the electroconductive layer includes a matrix containing a first rubber, and domains dispersed within the matrix, and the domains include a second rubber and an electronic electroconductive agent. Further, the electroconductive member satisfies the above <first requirement> and <second requirement>.

<First Requirement>

The first requirement regulates that stagnation of electric charges in the electroconductive member hardly occurs on the high frequency side.

Figure 3:
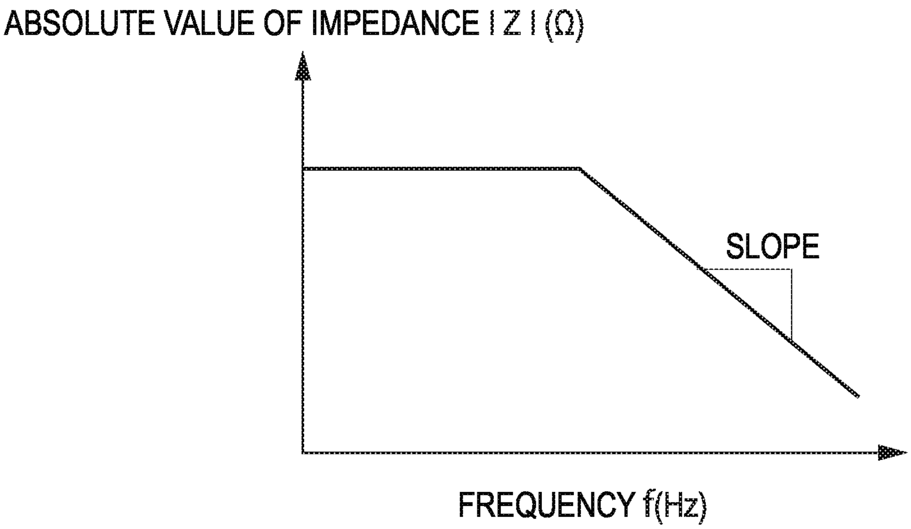
FIG. 3 is an explanatory diagram of a graph of impedance characteristics.

When the impedance of the electroconductive member in the related art is measured, the slope is always −1 on the high frequency side. Here, the slope means a slope with respect to a horizontal axis when the impedance characteristics of the electroconductive member are plotted in a logarithmic log with respect to frequency as illustrated in FIG. 3.

The equivalent circuit of the electroconductive member is represented by a parallel circuit of electric resistance R and capacitance C, and the absolute value of impedance |Z| can be expressed by the following Equation (1). At this time, f in Equation (1) represents the frequency.

$$|Z| = \sqrt{\frac{1}{R^{-2} + (2\pi f)^2 C^2}} \tag{1}$$

On the high frequency side, a straight line with an impedance slope of −1 can be presumed to be in a state where the movement of the electric charge cannot follow the high frequency voltage and stagnates, and thus electrical resistivity R greatly increases, so to speak, the insulation capacitance is measured. It can be presumed that the state in which the electric charge stagnates is a state in which R is approximated to infinity in Equation (1). At this time, in Equation (2) in which a denominator element is removed, $R^{-2}$ can be approximated to a very small value with respect to $(2\pi f)^2C^2$. Therefore, Equation (1) can be modified by approximation with Equation (3) with $R^{-2}$ removed. Finally, if Equation (3) is modified by taking the logarithm of both sides, it becomes Equation (4), and the slope of log f becomes −1.

$$R^{-2} + (2\pi f)^2 C^2 \tag{2}$$

$$|Z| = \sqrt{\frac{1}{(2\pi f)^2 C^2}} \tag{3}$$

$$\log |Z| = -\log f - \log(2\pi C) \tag{4}$$

Figure 4:
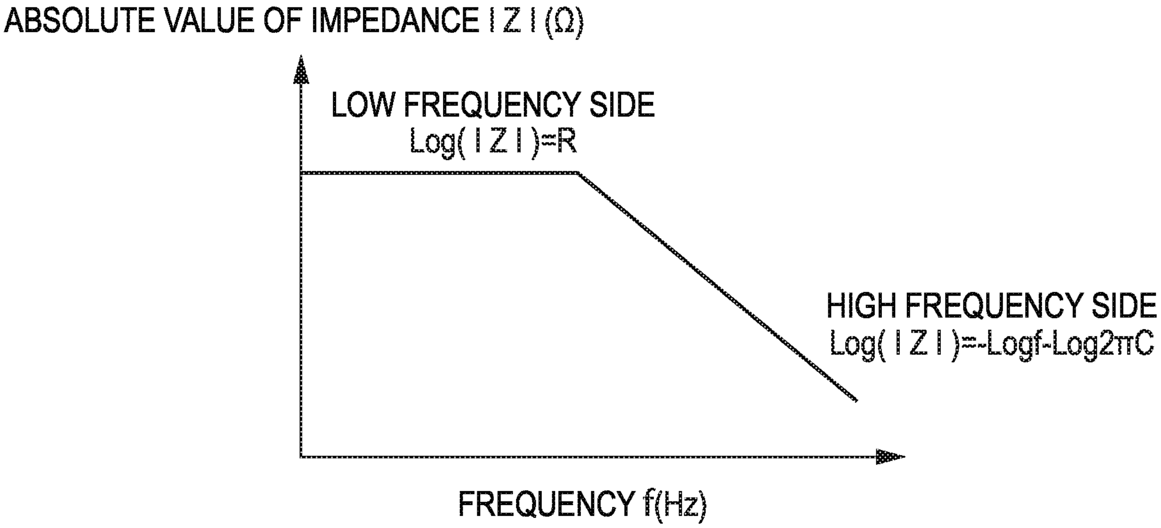
FIG. 4 is an explanatory diagram of impedance behavior.

The meanings of the above Equations (1) to (4) will be described with reference to FIG. 4. In FIG. 4, a vertical axis represents the logarithm of the absolute value of impedance, and a horizontal axis represents the logarithm of the frequency of a measured oscillating voltage. FIG. 4 illustrates impedance behavior expressed by Equation (1). First, as described above, the absolute value of the impedance satisfying Equation (1) decreases at a certain frequency as the frequency increases.

In the logarithmic log plot as illustrated in FIG. 4, the decreasing behavior is that the slope does not depend on the electrical resistivity or capacitance of the charging member, and the impedance draws a straight line having a slope of −1, as indicated in Equation (4).

When the impedance characteristics of an insulating electroconductive member are measured, from the fact that the impedance draws a straight line having a slope of −1, the characteristics are presumed to appear that when the slope is −1 in the measuring of the impedance of the electroconductive member, the movement of the electric charge is stagnant on the high frequency side. When the movement of the electric charge on the high frequency side is stagnant, the supply of the electric charge for the discharge cannot follow the frequency of the discharge. As a result, it is presumed that there is a timing at which discharge is not possible and thereby the discharge omission occurs.

On the other hand, in the electroconductive member having the impedance slope of −0.8 or more and −0.3 or less in a high frequency region of from $1.0\times10^5$ Hz to $1.0\times10^6$ Hz, the electric charge supply is unlikely to stagnate on the high frequency side. As a result, it is possible to supply the electric charge to discharges of frequencies of from a low frequency range to a high frequency range where the impedance has a constant value, particularly to discharges on the high frequency side where the electric charge stagnation is likely to occur. Since the electric charge can be sufficiently supplied, it is possible to suppress the discharge omission and increase the total amount of the discharge. The range of the high frequency region is considered to be a region where due to the discharge in a region at the highest frequency among the frequencies of the discharge generated from the electroconductive member, the discharge omission is likely to occur. By indicating a value in the above range in which the slope is larger than −1 in such a frequency region, the slope larger than −1 is obtained even in a high frequency region lower than the frequency region, and the occurrence of discharge omission is suppressed so that the total amount of discharge can be improved.

The present inventors consider that when the frequency of discharge is specifically predicted by using a case where a charging roller for electrophotography as a charging member and a photosensitive drum are combined, the range is as follows.

The discharge region in a moving direction of the surface of the charging roller, which is provided so as to face the outer surface of the photosensitive drum and rotates and moves in synchronization with the photosensitive drum, is set to from 0.5 mm to 1 mm. If the process speed of the electrophotographic apparatus is from 100 to 500 mm/sec at the maximum, the time for the surface of the photosensitive drum to pass through the discharge region is from $10^{-3}$ sec to $10^{-2}$ sec or more. In addition, when observing the discharge in detail, the length of the discharge region due to a single discharge is from 0.01 mm to 0.1 mm. Therefore, it is presumed that at least 5 to 100 times of discharges are generated while the same point on the surface of the charging roller passes through the discharge region. Therefore, it is presumed that the frequency of the discharge generated by the charging roller is in the range of several Hz to $1.0\times10^{6}$ Hz. As the process becomes faster, since it is necessary to increase the frequency of discharge to increase the number of discharges, the control of discharge and a conduction mechanism particularly in a high frequency region, among the above range, such as $1.0\times10^{5}$ Hz to $1.0\times10^{6}$ Hz is important.

As described above, in order to increase the number of discharges, it is effective to make the impedance slope in the high frequency region deviate from −1. As a result, it is possible to achieve well the characteristic of rapidly supplying the electric charge for the discharge and the subsequent discharge. When the slope of the impedance deviates from −1, it means that the supply of the electric charges in the electroconductive member is not stagnant, and thus the charging member can obtain the characteristic in the direction of suppressing the discharge omission.

<Second Requirement>

The impedance on the low frequency side according to the second requirement represents the characteristic that stagnation of the electric charges is unlikely to occur.

This can be seen from the region where the slope of the impedance on the low frequency side is not −1. Then, in Equation (1), if the frequency is approximated to zero, it can be approximated to the electrical resistivity R, and thus it can be seen that the electrical resistivity R represents the ability of the electric charge to move in a single direction.

Therefore, in the measurement while applying the low-frequency voltage, it can be assumed that the movement amount of the electric charges in the state where the movement of the electric charges can follow the vibration of the voltage is simulated.

The movement amount of the electric charges at a low frequency is an index of the ease of electric charge movement between the charging member and the measurement electrode, and it can an index of the amount of the electric charges that can be moved by discharge from the surface of the charging member to the photosensitive drum.

The amplitude of an AC voltage used for measuring the impedance according to the first requirement and the second requirement is 1 V. This oscillating voltage for measurement is significantly lower than the voltage applied to the charging member in the electrophotographic image forming apparatus of several hundred V to several thousand V. Therefore, it is considered that the easiness of discharge from the surface of the charging member can be evaluated in a higher dimension by measuring the impedance according to the first requirement and the second requirement.

Further, by satisfying the second requirement, the easiness of discharge can be controlled within an appropriate range. When the impedance is lower than $1.0\times10^{3}$ Ω, the amount of one discharge becomes too large, the supply of the electric charges for the subsequent discharge cannot be followed, and it works in the direction in which discharge is lost, which makes it difficult to suppress ghost images. On the other hand, when the impedance exceeds $1.0\times10^{7}$Ω, the easiness of discharge is reduced, and the discharge amount is not enough to fill the surface potential unevenness.

In the charging member as described in FIG. 4, the absolute value of the impedance takes a constant value in the low frequency region, and the impedance at $1.0\times10^{-2}$ Hz to $1.0\times10^{1}$ Hz can be substituted with the value of the impedance at the frequency of 1 Hz, for example.

The electroconductive member that satisfies both the first requirement and the second requirement can eliminate the unevenness of the surface potential of the photosensitive drum in the discharge amount in the frequency range from the low frequency side to the high frequency side to achieve the discharge at a level that suppresses ghost images. By satisfying the first requirement, it is possible to suppress the discharge omission on the high frequency side. Further, by satisfying the second requirement, the dischargeability is further improved, and the generation of the ghost image can be effectively suppressed.

<Method for Measuring Impedance>

The impedance can be measured by the following method.

When measuring the impedance, in order to eliminate the effect of contact resistance between the electroconductive member and the measurement electrode, a low-resistance thin film is deposited on the surface of the electroconductive member, and the thin film is used as an electrode while Impedance is measured at two terminals using an electroconductive support as a ground electrode.

Examples of the method for forming the thin film include a method for forming a metal film such as metal vapor deposition, sputtering, application of a metal paste, and attachment of a metal tape. Among these, the method for forming a metal thin film such as platinum or palladium as an electrode by vapor deposition is preferable from the viewpoint of reducing the contact resistance with the electroconductive member.

In a case of forming a metal thin film on the surface of the electroconductive member, when considering the simplicity and uniformity of the thin film, it is preferable to use a vacuum vapor deposition device that applies a mechanism that can hold the charging member to the vacuum vapor deposition device, and further applies a rotation mechanism to an electroconductive member having a cylindrical cross section. For the cylindrical electroconductive member whose cross section is formed of a curved surface such as a circular shape, it is difficult to connect the metal thin film as the above measurement electrode and the impedance measuring device, and thus the following method is preferably used. Specifically, the measurement may be performed by forming a metal thin film electrode with a width of from 10 mm to 20 mm in the longitudinal direction of the electroconductive member, then winding the metal sheet without gaps, and connecting the metal sheet with the measurement electrode coming out of the measuring device. With this, the electric signal from the electroconductive layer of the electroconductive member can be suitably obtained by the measuring device, and the impedance measurement can be performed. The metal sheet may be any metal sheet having an electrical resistivity equivalent to that of the metal portion of the connection cable of the measuring device when measuring the impedance, and for example, an aluminum foil or a metal tape can be used.

The impedance measuring device may be an impedance analyzer, a network analyzer, a spectrum analyzer, or any other device capable of measuring impedance in the frequency region up to $1.0\times10^{7}$ Hz. Among these, it is preferable to measure with an impedance analyzer from the electric resistance range of the electroconductive member.

The impedance measurement conditions will be described. The impedance at the frequency region of from $1.0\times10^{-2}$ Hz to $1.0\times10^{7}$ Hz is measured by using an impedance measuring device. The measurement is performed in an environment of temperature of 23° C. and humidity of 50% RH. In order to reduce the measurement variation, it is preferable to provide five or more measurement points per digit of frequency. The amplitude of the AC voltage is 1 V.

Regarding the measurement voltage, the measurement may be performed while applying the DC voltage in consideration of the shared voltage applied to the electroconductive member in the electrophotographic apparatus. Specifically, it is suitable for quantifying the characteristics of transport and accumulation of electric charges by measurement while applying the DC voltage of 10 V or less on an oscillation voltage.

Next, a method for calculating the impedance slope will be described.

For the measurement results measured under the above conditions, using a spreadsheet software (for example, "Windows Excel" (product name, available from Microsoft), the absolute value of the impedance is plotted in a logarithmic log graph against the measured frequency. The slope of the absolute value of the impedance in the frequency region of $1.0\times10^{5}$ to $1.0\times10^{6}$ Hz in the graph obtained by this logarithmic log plot may be obtained by using the measurement points in the frequency region of $1.0\times10^{5}$ to $1.0\times10^{6}$ Hz. Specifically, for the plot of the graph in the frequency range, an approximate straight line of the linear function may be calculated by a least squares method, and the slope thereof may be calculated.

Then, an arithmetic average value of the measurement points in the frequency region of $1.0\times10^{-2}$ to $1.0\times10^{1}$ Hz in the logarithmic log graph is calculated, and the obtained value may be used as the impedance on the low frequency side.

When measuring the slope of the impedance of the cylindrical charging member, the measurement is performed at five points at any location in each region when the longitudinal direction as the axial direction is divided into five parts, and the arithmetic average value of the measurement value of the slope at five points may be calculated.

Figure 5:
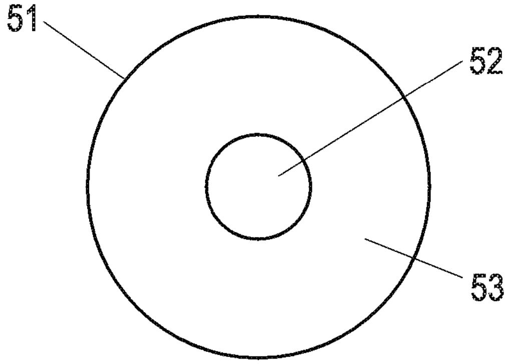
FIG. 5 is a sectional view perpendicular to a longitudinal direction of a charging roller.

The electroconductive member according to this aspect will be described with reference to FIG. 5 by taking an electroconductive member having a roller shape (hereinafter, an electroconductive roller) as an example. FIG. 5 is a sectional view perpendicular to a longitudinal direction, which is an axial direction of the electroconductive roller. The electroconductive roller 51 has a cylindrical electroconductive support 52, and an electroconductive layer 53 formed on the outer periphery of the support 52, that is, on the outer surface.

<Electroconductive Support>

A material forming the electroconductive support can be appropriately selected and used from materials known in the field of electrophotographic electroconductive members and materials that can be used as such electroconductive members. Examples thereof include metals or alloys such as aluminum, stainless steel, electroconductive synthetic resins, iron, and copper alloys. Further, these may be subjected to an oxidation treatment or a plating treatment with chromium, nickel, or the like. Either electroplating or electroless plating can be used as the type of plating. From the viewpoint of dimensional stability, the electroless plating is preferable. Examples of the electroless plating used here include nickel plating, copper plating, gold plating, and plating for other various alloys. The plating thickness is preferably 0.05 μm or more, and in consideration of the balance between working efficiency and rust prevention ability, the plating thickness is preferably from 0.1 to 30 μm. The cylindrical shape of the support may be a solid cylindrical shape or a hollow cylindrical shape. An outer diameter of this support is preferably in the range of from φ3 mm to φ10 mm.

The presence of a medium resistance layer or an insulating layer between the support and the electroconductive layer makes it impossible to quickly supply the electric charge after the electric charge has been consumed due to the discharge. Therefore, it is preferable to provide the electroconductive layer directly on the support, or to provide the electroconductive layer on the outer periphery of the support through only an intermediate layer formed of a thin film and an electroconductive resin layer such as a primer.

As the primer, known ones can be selected and used according to the rubber material for forming the electroconductive layer and the material of the support. Examples of the material for the primer include thermosetting resins and thermoplastic resins, and specifically, materials such as phenolic resins, urethane resins, acrylic resins, polyester resins, polyether resins, and epoxy resins can be used.

The impedance of the resin layer and the support is preferably in the range of from $1.0\times10^{-5}$ to $1.0\times10^{2}\Omega$ at a frequency of from $1.0\times10^{-2}$ Hz to $1.0\times10^{1}$ Hz. In a case of the support and the resin layer whose impedance in the low frequency is in the above range, the electric charges can be sufficiently supplied to the electroconductive layer, and a function, of a matrix-domain structure contained in the electroconductive layer, of suppressing the discharge omission according to the first and second requirements is not hindered, which is preferable.

The impedance of the resin layer can be measured by the same method as the above-described measurement of the slope of the impedance, except that the electroconductive layer existing on the outermost surface is peeled off. In addition, the impedance of the support can be measured by the same method as the above-described measurement of impedance, with the electroconductive layer or the coating layer formed of the resin layer and the electroconductive layer peeled off before coating the resin layer or electroconductive layer, or after forming the charging roller.

<Electroconductive Layer>

As the electroconductive member satisfying the <first requirement> and the <second requirement>, for example, an electroconductive member having an electroconductive layer satisfying the following configurations (i) to (iii) is preferable.

(i) The volume resistivity of the matrix is more than $1.0\times10^{12}$ Ω·cm and $1.0\times10^{17}$ Ω·cm or less.

(ii) The volume resistivity of the domain is $1.0\times10^{1}$ Ω·cm or more and $1.0\times10^{4}$ Ω·cm or less.

(iii) The distance between the adjacent wall surfaces of the domain is within a range of from 0.2 μm or more and 2.0 μm or less.

The configurations (i) to (iii) will be described below.

Figure 6:
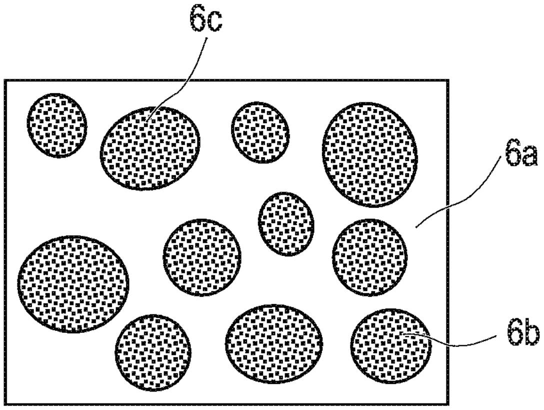
FIG. 6 is a schematic view of a sea-island structure.

FIG. 6 illustrates a partially sectional view of the electroconductive layer in a direction perpendicular to the longitudinal direction of the electroconductive roller. An electroconductive layer 6 has a matrix-domain structure having a matrix 6*a* and a domain 6*b*. The domain 6*b* includes electroconductive particles 6*c* as an electronic electroconductive agent.

In the electroconductive layer when a bias is applied between the electroconductive support and the body to be charged in the electroconductive member including the electroconductive layer in which the domain containing the electronic electroconductive agent is dispersed in the matrix, it is considered that the electric charges move from the electroconductive support side of the electroconductive layer to the opposite side, that is, to the outer surface side of the electroconductive member as follows. That is, the electric charge is accumulated near the interface with the matrix in the domain. Then, the electric charge is sequentially transferred from the domain positioned on the electroconductive support side to the domain positioned on the side opposite to the electroconductive support side, and reaches the surface on the side (hereinafter, also referred to as "the outer surface of the electroconductive layer") opposite to the electroconductive support side of the electroconductive layer. At this time, when the electric charges of all the domains move to the outer surface side of the electroconductive layer in one charging step, it takes time to accumulate the electric charges in the electroconductive layer for the subsequent charging step. That is, it becomes difficult to support a high-speed electrophotographic image forming process. Therefore, it is preferable that the transfer of electric charges between domains does not occur simultaneously even when a bias is applied. Further, even in a high frequency region where the movement of electric charges is restricted, it is effective to accumulate a sufficient amount of electric charges in the domain in order to discharge a sufficient amount of electric charges in one discharge.

As described above, in order to suppress the simultaneous transfer of electric charges between the domains when a bias is applied and to accumulate sufficient electric charges in the domains, it is preferable that the volume resistivity of the matrix is set to be more than $1.0\times10^{12}$ Ω·cm and $1.0\times10^{17}$ Ω·cm or less (configuration (i)), and the volume resistivity of the domain is set to be $1.0\times10^{1}$ Ω·cm or more and $1.0\times10^{4}$ Ω·cm or less (configuration (ii)), and the distance between adjacent wall surfaces between domains is set to be within a range of 0.2 μm or more and 2.0 μm or less (configuration (iii)).

<Configuration (i)>

Volume Resistivity of Matrix;

By setting the volume resistivity of the matrix to be more than $1.0\times10^{12}$ Ω·cm and $1.0\times10^{17}$ Ω·cm or less, it is possible to prevent the electric charge from circumventing the domain and moving in the matrix. In addition, it is possible to prevent the state as if an electroconductive path communicating with the electroconductive layer is formed when the electric charges accumulated in the domain leaks into the matrix.

Regarding the <first requirement>, the present inventors consider that in order to move the electric charges through the domain even in the electroconductive layer under application of a high-frequency bias, a configuration in which the region (domain) where the electric charges are sufficiently accumulated is divided by an electrically insulating region (matrix) is effective. Then, by setting the volume resistivity of the matrix to be within the range of the high resistance region as described above, it is possible to retain sufficient electric charges at an interface with each domain, and it is possible to suppress electric charge leakage from the domain.

Further, it has been found that it is effective to limit a movement path of the electric charge to a path with a domain interposed in order to obtain an electroconductive layer satisfying the <second requirement>. By suppressing the leakage of the electric charges from the domains to the matrix and limiting a transport path of the electric charges to a path with domains interposed, the density of the electric charges existing in the domains can be improved, and thus the electric charge in each domain can be improved to further increase the filling amount. With this, it is possible to improve the total number of electric charges that can be related to the discharge on the surface of the domain as an electroconductive phase that is a starting point of the discharge, and as a result, it is considered that the easiness of discharge from the surface of the charging member can be improved.

In addition, the discharge generated from the outer surface of the electroconductive layer includes a phenomenon in which electric charges are extracted from the domain as the electroconductive phase by the electric field, and at the same time, also includes a γ effect in which positive ions generated by ionization of air by an electric field collide with the surface of the electroconductive layer in which a negative electric charge exists and release the electric charge from the surface of the electroconductive layer. In the domain as the electroconductive phase on the surface of the charging member, as described above, the electric charges can be present at a high density. Therefore, it is presumed that when the positive ions collide with the surface of the electroconductive layer due to the electric field, the efficiency of generating discharged electric charges can be improved, and it is possible to generate more discharged electric charges as compared with the charging member in the related art.

Method for Measuring Volume Resistivity of Matrix;

The volume resistivity of the matrix can be measured with a fine probe after thinning the electroconductive layer. Examples of means for thinning include a sharp razor, a microtome, and a focused ion beam method (FIB).

When manufacturing thin pieces, it is necessary to eliminate the influence of domains and measure the volume resistivity of only the matrix, and therefore, it is necessary to manufacture the thin pieces with a film thickness smaller the distance between domains measured in advance with a scanning electron microscope (SEM) or a transmission electron microscope (TEM). Therefore, as means for thinning, means capable of manufacturing a very thin sample such as a microtome is preferable.

In the measurement of the volume resistivity, first, one side of the thin piece is grounded, and then the locations of the matrix and the domain in the thin piece are specified. These locations can be specified by a scanning probe microscope (SPM), an atomic force microscope (AFM), or the like by means capable of measuring the volume resistivity or hardness distribution of the matrix and domains. Then, a probe is brought into contact with the matrix, a DC voltage of 50 V is applied for five seconds, the arithmetic average value of the ground current value for five seconds is measured, and the electrical resistivity is calculated by dividing the arithmetic average value by the voltage. Then, the film thickness of the thin piece may be converted into the volume resistivity. At this time, means capable of measuring the shape such as SPM or AFM of the thin piece is preferable because the film thickness of the thin piece can be measured and the volume resistivity can be measured.

The volume resistivity of the matrix in the cylindrical electroconductive member can be measured by dividing the electroconductive layer into four sections in the circumferential direction, cutting out one thin sample from each of the five divided region in the longitudinal direction to obtain the above measurement values, and then calculating the arithmetic average value of the volume resistivity of 20 samples in total.

<Configuration (ii)>

Volume Resistivity of Domain;

The volume resistivity of the domain is preferably $1.0\times10^{1}$ Ω·cm or more and $1.0\times10^{4}$ Ω·cm or less. By making the volume resistivity of the domain lower, it is possible to more effectively limit the transport path of the electric charges to the path with domains interposed while suppressing unwanted transfer of the electric charges in the matrix.

Further, the volume resistivity of the domain is more preferably $1.0\times10^{2}$ Ω·cm or less. By reducing the volume resistivity of the domain to the above range, the amount of electric charges moving in the domain can be dramatically improved. Therefore, the impedance of the electroconductive layer at a frequency of from $1.0\times10^{-2}$ Hz to $1.0\times10^{1}$ Hz can be controlled to be in a lower range of $1.0\times10^{5}$Ω or lower so that the transport path of the electric charges can be more effectively limited to the domain.

The volume resistivity of the domain is adjusted by adjusting the electroconductivity of the rubber component of the domain to a predetermined value by using an electroconductive agent.

As the rubber material for the domain, a rubber composition containing a rubber component for the matrix can be used, and it is more preferable that a difference in solubility parameter (SP value) with the rubber material forming the matrix to form the matrix-domain structure is 0.4 $(J/cm^{3})^{0.5}$ or more and 5.0 $(J/cm^{3})^{0.5}$ or less, and is particularly, 0.4 $(J/cm^{3})^{0.5}$ or more and 2.2 $(J/cm^{3})^{0.5}$ or less.

The volume resistivity of the domain can be adjusted by appropriately selecting the type of electronic electroconductive agent and the additional amount thereof. As an electroconductive agent used to control the volume resistivity of the domain to be $1.0\times10^{1}$ Ω·cm or more and $1.0\times10^{4}$ Ω·cm or less, an electronic electroconductive agent that can greatly change the volume resistivity from high resistance to low resistance depending on the amount of dispersion is preferable.

Examples of the electronic electroconductive agent blended in the domain include oxides such as carbon black, graphite, titanium oxide, and tin oxide; metals such as Cu and Ag; and particles whose surface is coated with an oxide or metal to be electrically conductive. Further, if necessary, two or more types of these electroconductive agents may be used in an appropriate amount.

Among the above-mentioned electronic electroconductive agents, it is preferable to use electroconductive carbon black, which has high affinity with rubber and can easily control the distance between the electronic electroconductive agents. The type of carbon black blended in the domain is not particularly limited. Specific examples thereof include gas furnace black, oil furnace black, thermal black, lamp black, acetylene black, and Ketjen black.

Among these, electroconductive conductive carbon black having a DBP oil absorption of 40 $cm^{3}$/100 g or more and 170 $cm^{3}$/100 g or less, which can impart high electroconductive conductivity to the domain, can be preferably used.

The electronic electroconductive agent such as electroconductive conductive carbon black is preferably blended in the domain in an amount of 20 parts by mass or more and 150 parts by mass or less with respect to 100 parts by mass of the rubber component contained in the domain. A particularly preferable blending ratio is 50 parts by mass or more and 100 parts by mass or less. The content of the electroconductive conductive agent in these ratios is preferably such that a large amount of the electroconductive conductive agents are blended as compared with a general electrophotographic electroconductive member. As a result, the volume resistivity of the domain can be easily controlled to be within the range of $1.0\times10^{1}$ Ω·cm or more and $1.0\times10^{4}$ Ω·cm or less.

Further, if necessary, a filler, a processing aid, a cross-linking aid, a cross-linking accelerator, an anti-aging agent, a cross-linking accelerator, a cross-linking retarder, a softener, a dispersant, a colorant, and the like, which are generally used as a blending agent for rubber, may be added to the rubber composition for domains within a range that does not impair the effects of the present disclosure.

Method for Measuring Volume Resistivity of Domain;

The measurement of the volume resistivity of the domain may be performed by the same method as the above-described method for measuring the volume resistivity of the matrix, except that the measurement point is changed to a location corresponding to the domain and the applied voltage at the time of measuring the current value is changed to 1 V.

Here, the volume resistivity of the domain is preferably uniform. In order to improve the uniformity of the volume resistivity of the domains, it is preferable to make the amount of the electronic electroconductive agent in each domain uniform. This can further stabilize the discharge from the outer surface of the electroconductive member to the body to be charged.

Specifically, with respect to each cross-sectional area of each domain that appears in the cross section in the thickness direction of the electroconductive layer, when moieties of the electronic electroconductive agent contained in each domain, for example, a standard deviation of the ratio of a total cross-sectional area of the electroconductive particles to the cross-sectional area of the domain is defined as σr and a mean value is defined as μr, a coefficient of variation σr/μr is preferably 0 or more and 0.4 or less.

Since σr/μr is 0 or more and 0.4 or less, a method for reducing the variation in the number or amount of the electroconductive agent contained in each domain can be used. By imparting the uniformity of the volume resistivity of the domain based on such an index, it is possible to suppress the electric field concentration in the electroconductive layer and reduce the presence of the matrix to which the electric field is locally applied. With this, the electroconductivity in the matrix can be reduced as much as possible.

More preferable σr/μr is 0 or more and 0.25 or less, and it is possible to more effectively suppress the electric field concentration in the electroconductive layer, and further reduce the impedance at $1.0\times10^{-2}$ Hz to $1.0\times10^{1}$ Hz to $1.0\times10^{5}$Ω or less.

In order to improve the uniformity of the volume resistivity of the domains, it is preferable to increase the blending amount of carbon black with respect to the second rubber in the step of preparing a rubber mixture for forming a domain (CMB) described below.

Method for Measuring Uniformity of Volume Resistivity of Domain;

Since the uniformity of the volume resistivity of the domain is dependent on the amount of the electronic electroconductive agent in the domain, it can be evaluated by measuring the variation in the amount of the electronic electroconductive agent in each domain.

First, a slice is available from the same method as the method for measuring the volume resistivity of the matrix described above. Then, a fracture surface is formed by means such as a freeze fracture method, a cross polisher method, and a focused ion beam method (FIB). In consideration of the smoothness of the fracture surface and the pretreatment for observation, the FIB method is preferable. Further, in order to suitably observe the matrix-domain structure, a pretreatment such as a dyeing treatment or a vapor deposition treatment may be performed to obtain a favorable contrast between the domain as an electroconductive phase and the matrix as an insulating phase.

The existence of the matrix-domain structure is checked by observing the slice subjected to the formation of the fracture surface and the pretreatment with a scanning electron microscope (SEM) or a transmission electron microscope (TEM). Among these, it is preferable to perform observation with SEM at 1000 to 100,000 times in terms of accuracy of quantification of domain area.

The uniformity of low volume efficiency of the domains is preferably measured by quantifying a captured image of the fracture surface showing the matrix-domain structure. Image processing software (for example, "ImageProPlus", available from Media Cybernetics, Inc.) is used for the fracture surface image obtained by observation with SEM to perform 8-bit grayscale conversion, thereby obtaining a 256-tone monochrome image. Next, the black and white of the image is inverted so that the domain in the fracture surface becomes white, and binarization is performed. Then, a cross-sectional area S of the domain and a cross-sectional area Sc of the part made of the electroconductive agent in each domain are calculated by using a counting function in the image processing software for the binarized image. Then, the standard deviation $\sigma r$ and the average value $\mu r$ of the area ratio Sc/S in the domain of the electronic electroconductive agent may be calculated, and $\sigma r/\mu r$ may be calculated as an index of the uniformity of the volume resistivity of the domain.

Figure 8A:
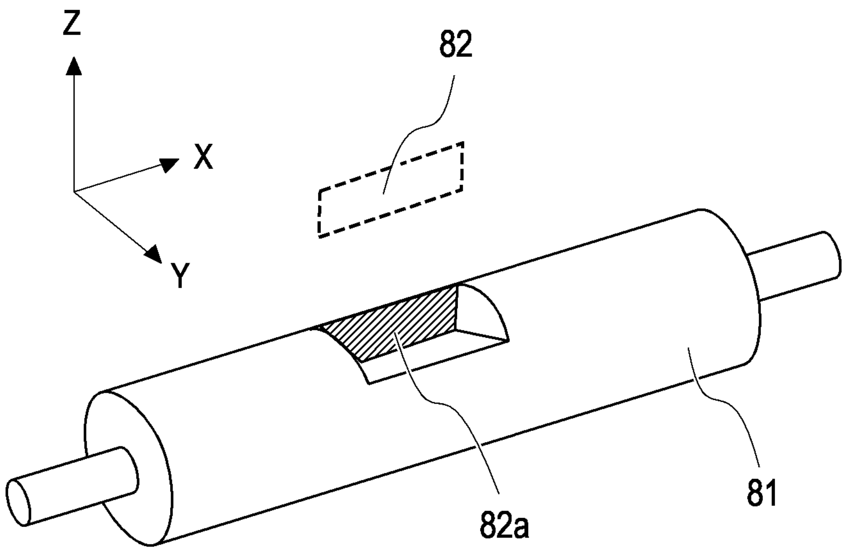
FIG. 8A is an explanatory diagram of a cross-section cutting direction.
Figure 8B:
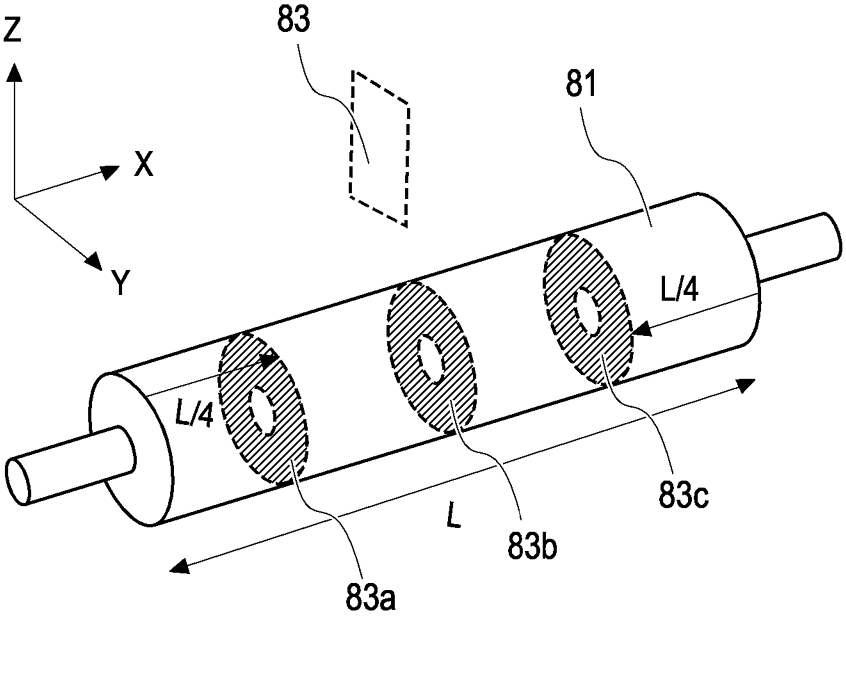
FIG. 8B is an explanatory diagram of a cross-section cutting direction.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and L/4 from both ends of the electroconductive layer toward the center. For each of the obtained cross sections, a 15 μm square observation area is obtained at any three locations in the thickness region from the outer surface of the electroconductive layer to the depth of from 0.1 T to 0.9 T in a support direction. $\sigma r/\mu r$ may be calculated as an index of the uniformity of the volume resistivity of the domain by binarizing and quantifying the observation area by the above method, and the arithmetic average value of the measurement values from the nine observation areas in total may be quantified as an index of the uniformity of domain size.

<Configuration (iii)>

Distance Between Adjacent Wall Surfaces Between Domains (Hereinafter Also Referred to as "Inter-Domain Surface Distances")

The inter-domain surface distances is preferably 0.2 μm or more and 2.0 μm or less.

In the matrix having the volume resistivity according to the configuration (i), the electroconductive layer in which the domain of the volume resistivity according to the configuration (ii) is dispersed has the inter-domain surface distances preferably 2.0 μm or less, and particularly 1.0 μm or less in order to satisfy the <second requirement>. On the other hand, the inter-domain surface distances is preferably 0.2 μm or more, and particularly preferably 0.3 μm or more in order to accumulate sufficient electric charges in the domains by surely dividing the domains from each other in the insulating region.

Method for Measuring Inter-Domain Surface Distances;

The method for measuring the inter-domain surface distances may be performed as follows.

First, a slice is available from the same method as the method for measuring the volume resistivity of the matrix described above. Then, a fracture surface is formed by means such as a freeze fracture method, a cross polisher method, and a focused ion beam method (FIB). In consideration of the smoothness of the fracture surface and the pretreatment for observation, the FIB method is preferable. Further, in order to suitably observe the matrix-domain structure, a pretreatment such as a dyeing treatment or a vapor deposition treatment may be performed to obtain a favorable contrast between an electroconductive phase and an insulating phase.

The existence of the matrix-domain structure is checked by observing the slice subjected to the formation of the fracture surface and the pretreatment with a scanning electron microscope (SEM) or a transmission electron microscope (TEM). Among these, it is preferable to perform observation with SEM at 1000 to 100,000 times in terms of accuracy of quantification of domain area.

The inter-domain surface distances is preferably measured by quantifying a captured image of the fracture surface showing the matrix-domain structure. Image processing software (for example, "Luzex" (product name, available from Nireco)) is used for the fracture surface image obtained by observation with SEM to perform 8-bit grayscale conversion, thereby obtaining a 256-tone monochrome image. Next, the black and white of the image is inverted so that the domain in the fracture surface becomes white, and binarization is performed. Next, the distance between the wall surfaces of the domain size group in the image is calculated. The distance between the wall surfaces at this time is the shortest distance between the adjacent domains.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and L/4 from both ends of the electroconductive layer toward the center. For each of the obtained cross sections, 50 μm square observation areas are obtained at any three locations in the thickness region from the outer surface of the electroconductive layer to the depth of from 0.1 T to 0.9 T in a support direction, and the inter-domain surface distances observed in each of the observation areas may be measured. Since it is necessary to observe a plane including the outer surface of the electroconductive layer from the support, which is the movement direction of electric charges, a slice is cut in the direction in which a cross section including a normal line with a central axis of the support as a starting point can be observed.

Uniformity of Inter-Domain Surface Distances;

With regard to the above configuration (iii), it is more preferable that the distribution of the inter-domain surface distances is uniform. The uniform distribution of the distance between the domains allows some locations with the distance between the domains to be formed locally in the electroconductive layer, and thus it is possible to reduce the phenomenon that the easiness of discharge is suppressed when, for example, there is a place where the supply of electric charges is delayed as compared to the surroundings.

In the cross section to which the electric charges are transported, that is, in the cross section of the electroconductive layer in the thickness direction as illustrated in FIG. 8B, when 50 μm square observation area is obtained at any three locations in the thickness region from the outer surface of the electroconductive layer to the depth of from 0.1 T to 0.9 T in a support direction, the variation coefficient am/Dm is preferably 0 or more and 0.4 or less using the average value Dm of the inter-domain surface distances and the variation am of the inter-domain surface distances in the observation area.

Method for Measuring Uniformity of Inter-Domain Surface Distances;

The uniformity of the inter-domain surface distances can be measured by quantifying the image obtained by direct observation of the fracture surface, similar to the measurement of the inter-domain surface distances described above.

The measurement may be performed in such a manner that by using image processing software such as LUZEX (available from Nireco Corporation) for the binarized image of the fracture surface obtained by the measurement of the inter-domain surface distances, the average value Dm of the inter-domain surface distances of the domain size group in the image and the standard deviation am of Dm may be calculated, and am/Dm may be calculated as an index of the uniformity of the inter-domain surface distances.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and at L/4 from both ends of the electroconductive layer toward the center. For each of the obtained cross sections, a 50 μm square observation area is obtained at any three locations in the thickness region from the outer surface of the electroconductive layer to the depth of from 0.1 T to 0.9 T in a support direction. σm/Dm of the inter-domain surface distances may be calculated by binarizing and quantifying the observation area by the above method, and the arithmetic average value of the measurement values from the nine observation areas in total may be quantified as an index of the uniformity of the inter-domain surface distances.

The electroconductive member according to this aspect can be formed, for example, by a method including the following steps (i) to (iv).

Step (i): a step of preparing a rubber mixture for forming a domain which contains carbon black and a second rubber (hereinafter, also referred to as "CMB");

Step (ii): a step of preparing a rubber mixture for forming a matrix which contains a first rubber (hereinafter, also referred to as "MRC");

Step (iii): a step of kneading CMB and MRC to prepare a rubber mixture having a matrix-domain structure.

Step (iv): a step of forming a layer of the rubber mixture prepared in the step (iii) on an electroconductive support directly or through another layer, and curing the layer of the rubber composition to form an electroconductive layer according to this aspect.

The configurations (i) to (iii) can be controlled by, for example, selecting the material used in each of the steps and adjusting the manufacturing conditions. This will be described below.

First, regarding the configuration (i), the volume resistivity of the matrix is determined by the composition of the MRC.

As the first rubber used for MRC, at least one type of rubber having low electroconductivity such as a natural rubber, a butadiene rubber, a butyl rubber, an acrylonitrile butadiene rubber, a urethane rubber, a silicone rubber, a fluorine rubber, an isoprene rubber, a chloroprene rubber, a styrene-butadiene rubber, an ethylene-propylene rubber, and a polynorbornene rubber may be used. In addition, assuming that the volume resistivity of the matrix can be within the above range, if necessary, a filler, a processing aid, a cross-linking agent, a cross-linking aid, a cross-linking accelerator, a cross-linking accelerator, a cross-linking retarder, an antioxidant, a softener, a dispersant, and a colorant are added to MRC. On the other hand, it is preferable that the MRC does not contain an electronic electroconductive agent such as carbon black in order to keep the volume resistivity of the matrix within the above range.

Further, the configuration (ii) can be adjusted by the amount of the electronic electroconductive agent in the CMB. For example, when exemplifying a case of using electroconductive carbon black having DBP oil absorption of 40 $cm^3/100$ g or more and 170 $cm^3/100$ g or less as an example of the electronic electroconductive agent, the configuration (ii) can be achieved by preparing the CMB so as to contain the electroconductive carbon black in an amount of 40% by mass or more and 200% by mass or less based on the total mass of CMB.

Further, regarding the configuration (iii), it is effective to control the following four matters (a) to (d).

(a) Difference in interfacial tension a between CMB and MRC;

(b) Ratio ($\eta m/\eta d$) of MRC viscosity ($\eta m$) to CMB viscosity ($\eta d$);

(c) Shear rate ($\gamma$) at the time of kneading CMB and MRC in Step (iii), and energy amount (EDK) at the time of shear (d) Volume fraction of CMB to MRC in step (iii).

(a) Difference in Interfacial Tension Between CMB and MRC

Generally, when two types of incompatible rubbers are mixed, phase separation occurs. This is because the interaction between the same polymers is stronger than the interaction between the different polymers, so that the same polymers agglomerate to reduce the free energy and to be stabilized. Since the interface of a phase-separated structure comes into contact with a different polymer, the free energy becomes higher than that of the inside which is stabilized by the interaction between the same molecules. As a result, in order to reduce the free energy of the interface, interfacial tension is generated to reduce the area in contact with the different polymer. When the interfacial tension is small, the different polymers tend to be mixed more uniformly in order to increase entropy. The state of being uniformly mixed means dissolution, and a SP value (solubility parameter) which is a measure of solubility and the interfacial tension tend to be correlated.

That is, it is considered that a difference in the interfacial tension between CMB and MRC and the interfacial tension between CMB and MRC correlate with the SP value difference of the rubber contained in each. As the first rubber in MRC and the second rubber in CMB, it is preferable to select a rubber in which the difference in the absolute value of the solubility parameter is 0.4 $(J/cm^3)^{0.5}$ or more and 5.0 $(J/cm^3)^{0.5}$ or less, and particularly 0.4 $(J/cm^3)^{0.5}$ or more and 2.2 $(J/cm^3)^{0.5}$ or less. Within this range, a stable phase-separated structure can be formed, and a domain diameter D of CMB can be reduced. Here, specific examples of the second rubber that can be used for CMB include a natural rubber (NR), an isoprene rubber (IR), a butadiene rubber (BR), a styrene-butadiene rubber (SBR), a butyl rubber (IIR), an ethylene-propylene rubber (EPM, EPDM), a chloroprene rubber (CR), a nitrile rubber (NBR), a hydrogenated nitrile rubber (H-NBR), a silicone rubber, and a urethane rubber (U). At least one of these can be used.

The thickness of the electroconductive layer is not particularly limited as long as the intended function and effect of the electroconductive member can be obtained. The thickness of the electroconductive layer is preferably 1.0 mm or more and 4.5 mm or less.

<Method for Measuring SP Value>

The SP value can be accurately calculated by creating a calibration curve using a material having a known SP value. A material manufacturer's catalog value can also be used for this known SP value.

For example, NBR and SBR do not depend on the molecular weight, and the SP value is almost determined by the content ratio of acrylonitrile and styrene. Therefore, regarding the rubber constituting the matrix and the domain, using an analysis method such as pyrolysis gas chromatography (Py-GC) and solid-state NMR, by analyzing the content ratio of acrylonitrile or styrene, the SP value can be calculated from the calibration curve obtained from a material having a known SP value. Further, regarding the isoprene rubber, the SP value is determined by an isomer structure such as 1,2-polyisoprene, 1,3-polyisoprene, 3,4-polyisoprene, cis-1,4-polyisoprene, and trans-1,4-polyisoprene. Therefore, similar to SBR and NBR, the isomer content ratio can be analyzed by Py-GC, solid NMR, and the like, and the SP value can be calculated from a material having a known SP value.

(b) Viscosity Ratio of CMB and MRC

The closer the viscosity ratio (ηd/ηm) of CMB and MRC is to 1, the smaller the maximum ferret diameter of the domain can be made. Specifically, the viscosity ratio is preferably 1.0 or more and 2.0 or less. The viscosity ratio of CMB and MRC can be adjusted by selecting the Mooney viscosity of the raw material rubber used for CMB and MRC, and by mixing the types and amounts of fillers. It is also possible to add a plasticizer such as a paraffin oil to the extent that the formation of the phase-separated structure is not hindered. In addition, the viscosity ratio can be adjusted by adjusting the temperature at the time of kneading. The viscosity of the rubber mixture for forming the domain and the rubber mixture for forming the matrix can be obtained by measuring the Mooney viscosity ML(1+4) at the rubber temperature at the time of kneading based on JIS K6300-1: 2013.

(c) Shear Rate at the Time of Kneading MRC and CMB, and Energy Amount at the Time of Shear The higher the shear rate at the time of kneading MRC and CMB and the larger the energy amount at the time of shear, the smaller the inter-domain surface distances can be made.

The shear rate can be increased by increasing the inner diameter of a stirring member such as a blade or a screw of a kneading machine, reducing a gap between the end surface of the stirring member and the inner wall of the kneading machine, or increasing the rotation speed. In order to increase the energy at the time of shear, it is possible to increase the rotation speed of the stirring member and the viscosity of the first rubber in CMB and the second rubber in MRC.

(d) Volume Fraction of CMB to MRC

The volume fraction of CMB to MRC correlates with the collision coalescence probability of the rubber mixture for forming a domain to a rubber mixture for forming a matrix. Specifically, when the volume fraction of the rubber mixture for forming a domain to the rubber mixture for forming a matrix is reduced, the collision coalescence probability of the rubber mixture for forming a domain and the rubber mixture for forming a matrix is reduced. In other words, the distance between the domains can be reduced by reducing the volume fraction of the domains in the matrix within the range where the required electroconductivity can be obtained. The volume fraction of CMB to MRC is preferably 15% or more and 40% or less.

Further, in the electroconductive layer of the electroconductive member according to the present aspect, when the length of the electroconductive layer in the longitudinal direction is defined as L, for each of the cross sections in the thickness direction of the electroconductive layer at three locations of the center of the electroconductive layer in the longitudinal direction and L/4 from both ends of the electroconductive layer toward the center, when a 15 μm square observation area is placed at any three locations in the thickness region from the outer surface of an elastic layer to the depth of from 0.1 T to 0.9 T, it is preferable that among the domains observed in each of the observation areas, 80% by number or more of the domains satisfy the following configurations (iv) and (v).

Configuration (iv)

The ratio of the cross-sectional area of the electroconductive particles contained in the domain to the cross-sectional area of the domain is 20% or more.

Configuration (v)

When defining a perimeter of the domain as A, and defining an envelope perimeter of the domain as B, A/B is 1.00 or more and 1.10 or less.

The above configurations (iv) and (v) can be said to be regulations regarding the shape of the domain. The "shape of domain" is defined as a cross-sectional shape of the domain appearing in the cross section of the electroconductive layer in the thickness direction. In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and at L/4 from both ends of the electroconductive layer toward the center. For each of the obtained cross sections, a 15 μm square observation area is placed at any three locations in the thickness region from the outer surface of the electroconductive layer to the depth of from 0.1 T to 0.9 T in a support direction. The domain shape is defined by the shape of each domain observed in each of the observation areas.

It is preferable that the shape of the domain is such that the peripheral surface thereof has no irregularities. By reducing the number of irregular structures related to the shape, it is possible to reduce the non-uniformity of the electric field between the domains, that is, to reduce the number of locations where the electric field is concentrated and reduce the phenomenon of unnecessary electric charge transport in the matrix.

The present inventors have found that the amount of electroconductive particles contained in one domain affects an outer shape of the domain. That is, it has been found that the outer shape of the domain became closer to a sphere as the filling amount of the electroconductive particles in one domain is increased. The larger the number of domains close to a sphere, the smaller the concentration point of electron transfer between domains can be reduced. Then, according to the studies by the present inventors, the reason is not clear, but based on the cross-sectional area of one domain, the domain in which the ratio of the total cross-sectional area of the electroconductive particles observed in the cross section is 20% or more can be made closer to a sphere. As a result, an outer shape that can significantly alleviate the concentration of electron transfer between domains can be obtained, which is preferable. Specifically, the ratio of the cross-sectional area of the electroconductive particles contained in the domain to the cross-sectional area of the domain is preferably 20% or more.

The present inventors have found that it is preferable to satisfy the following Equation (5) relating to a shape in which the circumferential surface of the domain has no irregularities.

$$1.00 \leq AB \leq 1.10 \tag{5}$$

(A: perimeter of domain, B: envelope perimeter of domain)

Figure 7:
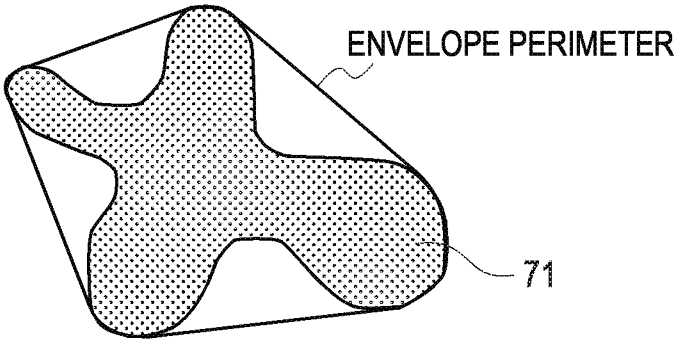
FIG. 7 is an explanatory diagram of an envelope perimeter.

Equation (5) indicates a ratio of the perimeter A of the domain to the envelope perimeter B of the domain. Here, the envelope perimeter is a perimeter when protrusion portions of a domain 71 observed in the observation area are connected, as illustrated in FIG. 7.

The ratio of the perimeter of the domain to the envelope perimeter of the domain has a minimum value of 1, and a state where the value is 1 indicates that the domain has a shape such as a perfect circle or an ellipse in which there is no recess in the cross-sectional shape. When these ratios exceed 1.1, large irregularities are present in the domain, that is, anisotropy of electric field is exhibited.

<Method for Measuring Each Parameter Related to Domain Shape>

First, a slice is available from the same method as the method for measuring the volume resistivity of the matrix described above. However, as described below, it is necessary to create a slice by a cross section perpendicular to the longitudinal direction of the electroconductive member and evaluate the shape of the domain in the fracture surface of the slice. The reason for this will be described below.

FIGS. 8A and 8B are diagrams illustrating the shape of an electroconductive member 81 as three axes, specifically, three dimensions of X, Y, and Z axes. FIGS. 8A and 8B, the X axis indicates a direction parallel to the longitudinal direction (axial direction) of the electroconductive member, and the Y axis and the Z axis indicate directions perpendicular to the axial direction of the electroconductive member.

FIG. 8A illustrates an image view of cutting out the electroconductive member at a cross section 82*a* parallel to an XZ plane 82 with respect to the electroconductive member. The XZ plane can rotate 360° about the axis of the electroconductive member. When considering that the electroconductive member is rotated while being in contact with the photosensitive drum and passing through the gap with the photosensitive drum, the cross section 82*a* parallel to the XZ plane 82 means a plane on which the discharge simultaneously occurs at a certain timing. The surface potential of the photosensitive drum is formed by passing a plane corresponding to a certain amount of the cross section 82*a*.

Therefore, in order to evaluate the shape of the domain, which is correlated with the electric field concentration in the electroconductive member, it is necessary to perform the evaluation in a cross section parallel to the YZ plane 83 that is perpendicular to the axial direction of the electroconductive member, and that can evaluate the domain shape including a certain amount of cross section 82*a*, instead of the analysis of the cross section, such as the cross section 82*a*, in which the discharge simultaneously occurs at a certain moment. In this evaluation, when the length of the electroconductive layer in the longitudinal direction is defined as L, total three locations of a cross section 83*b* at the center of the electroconductive layer in the longitudinal direction, and two cross sections (83*a* and 83*c*) at L/4 from both ends of the electroconductive layer toward the center are selected.

Regarding the observation positions of the cross sections 83*a* to 83*c*, when the thickness of the electroconductive layer is T, if the observation area having a 15 μm square is placed at any three locations in the thickness region from the outer surface of each slice to a depth of 0.1 T or more and 0.9 T or less, the measurement may be performed in a total of nine observation areas.

The fracture surface can be formed by means such as a freeze fracture method, a cross polisher method, and a focused ion beam method (FIB). In consideration of the smoothness of the fracture surface and the pretreatment for observation, the FIB method is preferable. Further, in order to suitably observe the matrix-domain structure, a pretreatment such as a dyeing treatment or a vapor deposition treatment may be performed to obtain a favorable contrast between an electroconductive phase and an insulating phase.

The matrix-domain structure can be observed using a scanning electron microscope (SEM) or a transmission electron microscope (TEM) on the slice subjected to the formation of the fracture surface and the pretreatment. Among these, it is preferable to perform observation with SEM at 1000 to 100,000 times in terms of accuracy of quantification of domain area.

The perimeter and the envelope perimeter of the domain, and the number of domains can be measured by quantifying the captured image as described above. Using the image processing such as ImageProPlus (available from Media Cybernetics, Inc.) for the fracture surface image obtained by SEM observation, 15 μm square analysis region is extracted from each of the nine images obtained at each observation position to perform 8-bit grayscale conversion, thereby obtaining a 256-tone monochrome image. Then, the black and white of the image is inverted so that the domain in the fracture surface becomes white, and binarized to obtain a binarized image for analysis.

<<Method for Measuring Cross-Sectional Area Ratio μr of Electroconductive Particles in Domain>>

The cross-sectional area ratio of the electroconductive particles in the domain can be measured by quantifying the binarized image. A cross-sectional area S of the domain and a sum Sc of a cross-sectional area of the part made of the electroconductive agent in each domain are calculated by using a counting function in the image processing software "ImageProPlus" (available from Media Cybernetics, Inc.) for the binarized image. Then, the arithmetic average value μr (%) of Sc/S may be calculated.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 6, are obtained at three locations of the center of the electroconductive layer in the longitudinal direction and at L/4 from both ends of the electroconductive layer toward the center. For each of the obtained cross sections, the above measurement may be performed in 15 μm square observation areas at any three locations in the thickness region from the outer surface of the electroconductive layer to the depth of from 0.1 T to 0.9 T in a support direction, so that the cross-sectional area ratio is calculated from the arithmetic average value of the measured values from a total of nine regions.

<<Method for Measuring Perimeter A and Envelope Perimeter B of the Domain>>

The perimeter and the envelope perimeter of the domain, and the number of domains can be measured by quantifying the binarized image as described above. By using the counting function of the image processing software "ImageProPlus" (available from Media Cybernetics, Inc.) for the binarized image, the perimeter A of the domain and the envelope perimeter B of the domain of the domain size group in the image may be calculated so calculate the arithmetic average value of the perimeter ratio A/B of the domain.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and at L/4 from both ends of the electroconductive layer toward the center. For each of the obtained cross sections, the above measurement may be performed in 15 μm square observation areas at any three locations in the thickness region from the outer surface of the electroconductive layer to the depth of from 0.1 T to 0.9 T in a support direction, so that the cross-sectional area ratio is calculated from the arithmetic average value of the measured values from a total of nine regions.

<<Method for Measuring Shape Index of Domain>>

The shape index of the domain may be calculated by calculating the number percent of the domain group, in which μr (%) is 20% or more and the perimeter ratio AB of the domain satisfies the above Equation (5), with respect to the total number of domains. For the binarized image, using the count function of the image processing software "ImageProPlus" (Media Cybernetics Co., Ltd.), the number in the binarized image of the domain group may be calculated to further obtain the number percent of domains that satisfy $\mu r \geq 20$ and the above Equation (5).

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and at L/4 from both ends of the electroconductive layer toward the center. For each of the obtained cross sections, the above measurement may be performed in 15 μm square observation areas at any three locations in the thickness region from the outer surface of the electroconductive layer to the depth of from 0.1 T to 0.9 T in a support direction, so that the cross-sectional area ratio is calculated from the arithmetic average value of the measured values from a total of nine regions.

As defined in configuration (iv), by filling the domain with electroconductive particles at a high density, the outer shape of the domain can be made closer to a sphere, and the irregularities can be made small as defined in configuration (v).

Particularly, carbon black having a DBP oil absorption of 40 $cm^3$/100 g or more and 80 $cm^3$/100 g or less can be preferably used as the electroconductive particles in order to obtain a domain with which the electroconductive particles are filled at a high density, as defined in the configuration (iv). The DBP oil absorption ($cm^3$/100 g) means a volume of dibutyl phthalate (DBP) capable of adsorbing 100 g of carbon black, and is measured based on Japanese Industrial Standards (JIS) K 6217-4:2017 (carbon black for rubber-basic characteristics—Part 4: Method for obtaining oil absorption (including compressed sample)). Generally, carbon black has a tufted higher-order structure in which primary particles having an average particle size of 10 nm or more and 50 nm or less are aggregated. This tufted higher-order structure is called a structure, and a degree thereof is quantified by the DBP oil absorption ($cm^3$/100 g).

Generally, carbon black having a developed structure has a high reinforcing property to rubber, the carbon black is poorly taken into the rubber, and the shear torque at the time of kneading is extremely high. Therefore, it is difficult to increase the filling amount in the domain.

On the other hand, the electroconductive carbon black having the DBP oil absorption within the above range has a less-developed structure, so that the carbon blacks are less aggregated and has good dispersibility in rubber. Therefore, the filling amount in the domain can be increased, and as a result, the outer shape of the domain can be more easily made closer to a sphere.

Further, in the carbon black having a developed structure, the carbon blacks are easily aggregated with each other, and the aggregates are likely to be a lump having a large irregular structure. When such an aggregate is included in the domain, it is difficult to obtain the domain related to the requirement (v). The formation of the aggregate may affect the shape of the domain to form an irregular structure. On the other hand, the electroconductive carbon black having the DBP oil absorption within the above range is difficult to form aggregates, and is therefore effective in creating the domain relating to the requirement (v).

<Domain Size>

The domain according to the present aspect, an average of the maximum ferret diameter (hereinafter, also simply referred to as "domain diameter") L of the domain included in each of the domains satisfying the above-mentioned configuration (iv) and configuration (v) is preferably 0.1 μm or more and 5.0 μm or less.

When setting the average value of the domain diameter L to be 0.1 μm or more, it is possible to effectively limit the path through which electric charges move to the intended path in the electroconductive layer. Further, when setting the average value of the domain diameter L to be 5.0 μm or less, the ratio of the surface area to the entire area of the domain, that is, the specific surface area can be exponentially increased, and the discharging efficiency of the electric charges from the domain can be dramatically improved. For the above reason, the average value of the domain diameter L is preferably 2.0 μm or less, and more preferably 1.0 μm or less.

In order to further reduce the electric field concentration between the domains, it is preferable that the outer shape of the domain is made closer to a sphere. For that purpose, it is preferable that the domain diameter can be made smaller within the above range. Examples of the method include, in Step (iv), a method of controlling the domain diameter of CMB to be small in a step of kneading MRC and CMB and performing phase separation on MRC and CMB to prepare a rubber mixture in which the domain of CMB is formed in the matrix of MRC. When the domain diameter of CMB is reduced, the specific surface area of CMB is increased and the interface with the matrix is increased, and therefore, a tension acting to reduce the tension acts on the interface of the domain of CMB. As a result, the outer shape of the domain of CMB is closer to a sphere.

Here, regarding the factors that determine the domain diameter L in the matrix-domain structure formed when two incompatible polymers are melt-kneaded, Taylor's Equation (Equation (6)), Wu's empirical Equation (Equations (7) and (8)), and Tokita's Equation (Equation (9)) are known.

Taylor's Equation $$D=[C\cdot\sigma/\eta m\cdot\gamma]\cdot f(\eta m/\eta d) \quad (6)$$

Wu's empirical Equation $$\gamma\cdot D\cdot\eta m/\sigma=4(\eta d/\eta m)0.84\cdot\eta d/\eta m>1 \quad (7)$$

$$\gamma\cdot D\cdot\eta m/\sigma=4(\eta d/\eta m)-0.84\cdot\eta d/\eta m<1 \quad (8)$$

Tokita's Equation $$D=12\cdot\sigma\cdot\varphi/(\pi\cdot\eta\cdot\gamma)\cdot(1+4\cdot P\cdot\varphi\cdot EDK/(\pi\cdot\eta\cdot\gamma)) \quad (9)$$

In Equations (6) to (9), D represents the maximum ferret diameter of the domain of CMB, C represents a constant, σ represents interfacial tension, ηm represents the viscosity of the matrix, ηd represents the viscosity of the domain, and γ represents the shear rate, η represents the viscosity of mixed system, P represents the collision coalescence probability, φ represents domain phase volume, and EDK represents domain phase cutting energy.

In order to equalize the inter-domain surface distances in relation to the configuration (iii), it is effective to reduce the domain sands according to the above Equations (6) to (9). Further, the matrix-domain structure is also governed by where a kneading step is stopped in a process of the kneading step in which the raw material rubber of the domain splits and the grain system gradually becomes smaller. Therefore, the uniformity of the inter-domain surface distances can be controlled by the kneading time in the kneading process and the kneading rotation speed that is an index of the strength of the kneading, and the longer the kneading time and the higher the kneading rotation speed, the more uniform the inter-domain surface distances can be.

Uniformity of Domain Size;

It is preferable that the domain size is uniform, that is, the particle size distribution is narrow. By evening out the distribution of the size of domains through which the electric charges pass in the electroconductive layer, it is possible to suppress the concentration of the electric charges in the matrix-domain structure and effectively increase the easiness of discharge across the entire surface of the electroconductive member. In the cross section to which the electric charges are transported, that is, in the cross section of the electroconductive layer in the thickness direction as illustrated in FIG. 5, when 50 μm square observation area is obtained at any three locations in the thickness region from the outer surface of the electroconductive layer to the depth of from 0.1 T to 0.9 T in a support direction, the ratio σd/D (variation coefficient σd/D) of the standard deviation σd of the domain size and the average value D of the domain size is preferably 0 or more and 0.4 or less.

In order to improve the uniformity of the domain size, similar to the method of improving the uniformity of the inter-domain surface distances described above, the uniformity of the domain size is also improved by reducing the domain size according to Equations (6) to (9). Further, the matrix-domain structure is also governed by where a kneading step is stopped in a process of the kneading step in which the raw material rubber of the domain splits and the grain system gradually becomes smaller. Therefore, the uniformity of the domains size can be controlled by the kneading time in the kneading process and the kneading rotation speed that is an index of the strength of the kneading, and the longer the kneading time and the higher the kneading rotation speed, the more uniform the domain size can be.

Method for Measuring Uniformity of Domain Size;

The uniformity of the domain size can be measured by quantifying the image obtained by direct observation of the fracture surface, which is obtained by the same method as the measurement of the uniformity of the inter-domain surface distances described above.

Specifically, by using the counting function of the image processing software "ImageProPlus" (available from Media Cybernetics, Inc.) for the binarized image having the domain and the matrix, which is obtained by the measurement of the inter-domain surface distances described above, the ratio ad/D between the standard deviation ad of the domain size group and the average value D may be calculated.

In a case of the cylindrical charging member, the index of the uniformity of domain size can be quantified by calculating ad/D of the inter-domain surface distances on the normal line with the central axis of the support as the starting point.

In a case of a cylindrical charging member, when a length of the electroconductive layer in the longitudinal direction is defined as L and a thickness of the electroconductive layer is defined as T, cross sections of the electroconductive layer in the thickness direction, as illustrated in FIG. 8B, are obtained at three locations of the center of the electroconductive layer in the longitudinal direction and L/4 from both ends of the electroconductive layer toward the center. For each of the obtained cross sections, a 50 μm square observation area is obtained at any three locations in the thickness region from the outer surface of the electroconductive layer to the depth of from 0.1 T to 0.9 T in a support direction. σd/D of the inter-domain surface distances may be calculated by binarizing and quantifying the observation area by the above method, and the arithmetic average value of the measurement values from the nine observation areas in total may be quantified as an index of the uniformity of the domain size.

<Method for Checking Matrix-Domain Structure>

The existence of the matrix-domain structure in the electroconductive layer can be checked by manufacturing a thin piece from the electroconductive layer and observing the fracture surface formed on the thin piece in detail.

Examples of means for thinning include a sharp razor, a microtome, and a FIB. Further, in order to more accurately observe the matrix-domain structure, a pretreatment such as a dyeing treatment or a vapor deposition treatment may be performed on the thin piece for observation to obtain a favorable contrast between the domain as an electroconductive phase and the matrix as an insulating phase.

The existence of matrix-domain structure can be checked by observing the fracture surface with a laser microscope, a scanning electron microscope (SEM) or a transmission electron microscope (TEM) on the thin piece subjected to the formation of the fracture surface and the pretreatment as necessary. As a method for easily and accurately checking a sea-island structure, it is preferable to observe with a scanning electron microscope (SEM).

After obtaining a thin piece of the electroconductive layer by the method as described above and obtaining an image obtained by observing the surface of the thin piece at a magnification of 1,000 to 10,000, the image processing is performed by using the image processing software "ImageProPlus" (available from Media Cybernetics, Inc.) to perform 8-bit grayscale conversion, thereby obtaining a 256-tone monochrome image. Next, the black and white of the image is inverted so that the domain in the fracture surface becomes white, and binarized to obtain an analysis image. The presence or absence of the matrix-domain structure may be determined based on the analysis image that has been image-processed in a state of distinguishing the domain and the matrix by binarization.

In a case where the analysis image has a structure in which domains exist in an isolated state in the matrix as illustrated in FIG. 6, the existence of the matrix-domain structure in the electroconductive layer can be checked. The isolated state of the domain may be a state in which each domain is disposed not connected to the other domain, the matrix communicates in the image, and the domain is divided by the matrix. Specifically, a state, in which when a region within 50 μm square in the analysis image is defined as an analysis region, the number of domains existing in the isolated state as described above is 80 number % or more with respect to the total number of domain groups that do not have contact with a frame line of the analysis region, is defined as a state having a sea-island structure.

The checking as described above may be performed in such a manner that the electroconductive layer of the electroconductive member is equally divided into five regions in the longitudinal direction, equally divided into four regions in the circumferential direction to manufacture a slice optionally from each region, 20 sections in total, and then the above measurement is performed on the sections.

<Process Cartridge>

Figure 9:
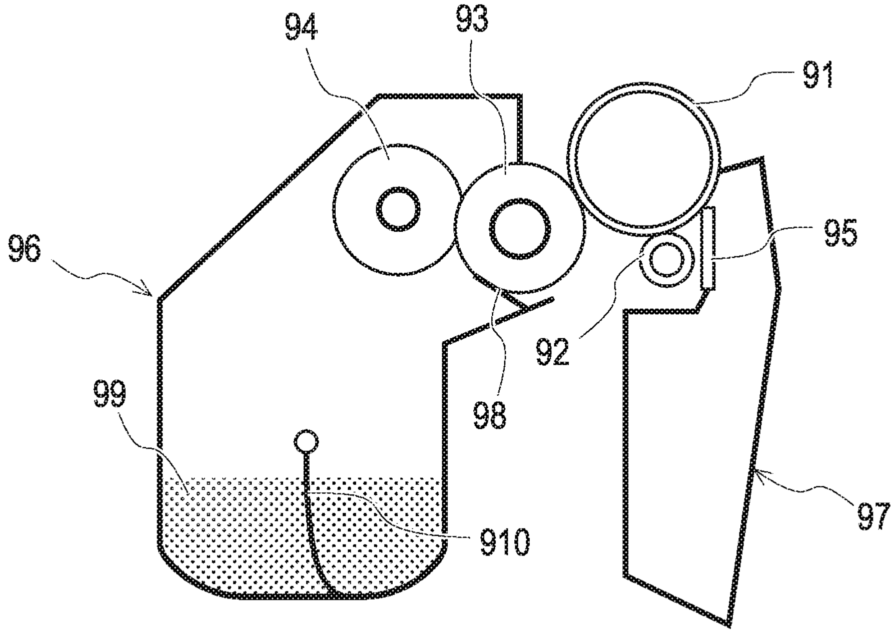
FIG. 9 is a schematic diagram of a process cartridge.

FIG. 9 is a schematic sectional view of a process cartridge for electrophotography including an electroconductive member according to an aspect of the present disclosure as a charging roller. This process cartridge has a developing device and a charging device integrated with each other, and is configured to be detachably attachable to a main body of the electrophotographic apparatus. The developing device is a device having at least a developing roller 93 and a toner container 96 integrated with each other, and may include a toner supply roller 94, a toner 99, a developing blade 98, and a stirring blade 910, as necessary. The charging device is a device having at least a photosensitive drum 91, a cleaning blade 95, and a charging roller 92 integrated with each other, and may include a waste toner container 97. A voltage is applied to each of the charging roller 92, the developing roller 93, the toner supply roller 94, and the developing blade 98.

<Electrophotographic Apparatus>

Figure 10:
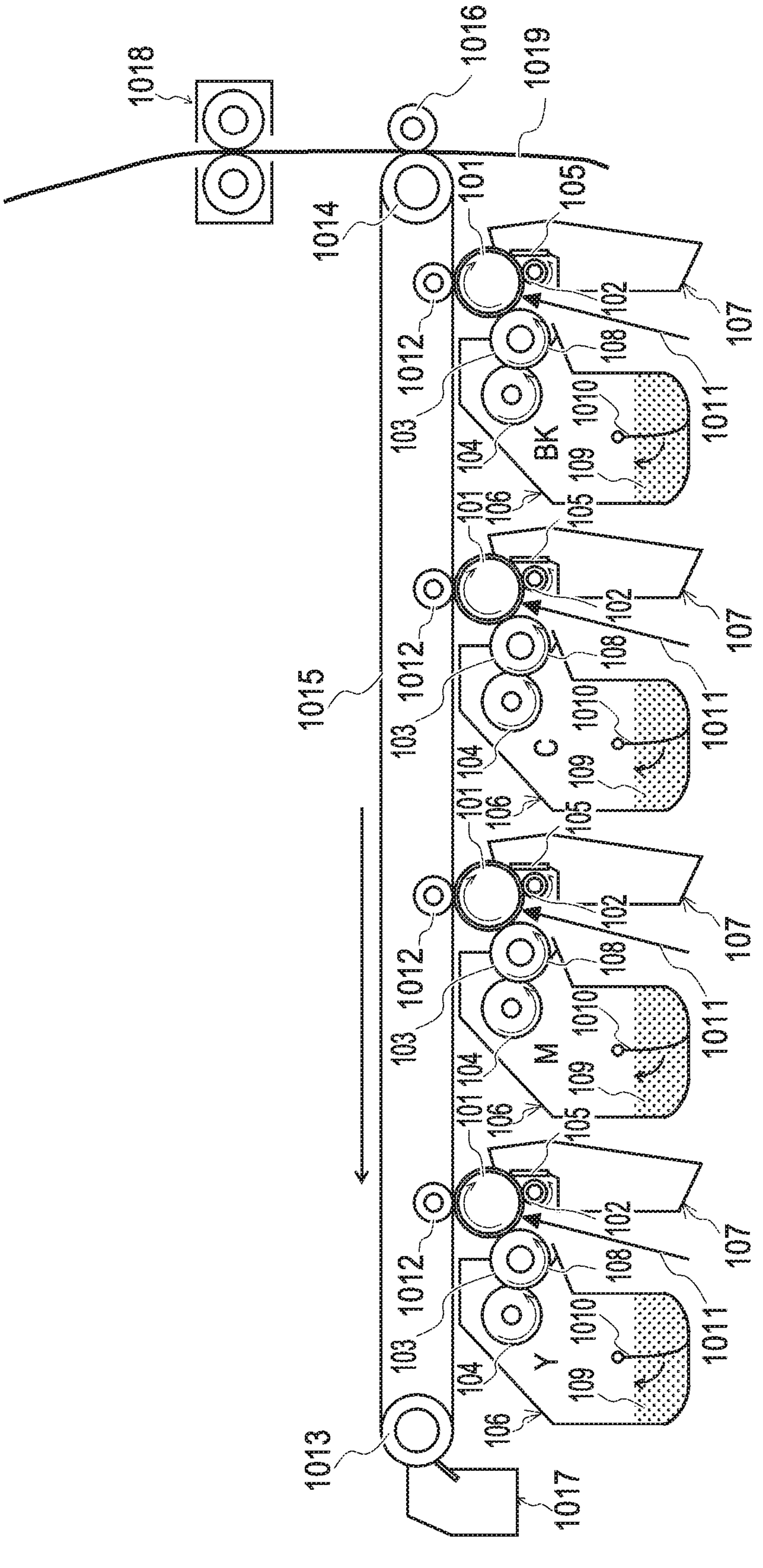
FIG. 10 is a schematic diagram of an electrophotographic apparatus.

FIG. 10 is a schematic configuration diagram of an electrophotographic apparatus using the electroconductive member according to an aspect of the present disclosure as a charging roller. This electrophotographic apparatus is a color electrophotographic apparatus in which four process cartridges are mounted to be detachably attachable. Toners of black, magenta, yellow, and cyan are used for each process cartridge. A photosensitive drum 101 rotates in the direction of an arrow and is uniformly charged by a charging roller 102 to which a voltage is applied from a charging bias power source, and an electrostatic latent image is formed on the surface of the photosensitive drum 101 by exposure light 1011. On the other hand, a toner 109 stored in a toner container 106 is supplied to a toner supply roller 104 by a stirring blade 1010 and is transported onto a developing roller 103. Then, the developing blade 108 disposed in contact with the developing roller 103 uniformly coats the surface of the developing roller 103 with the toner 109, and at the same time, the electric charge is imparted to the toner 109 by triboelectric charging. The electrostatic latent image is visualized as a toner image by developing with the toner 109 transported by the developing roller 103 disposed in contact with the photosensitive drum 101.

The visualized toner image on the photosensitive drum is transferred to an intermediate transfer belt 1015 which is supported and driven by a tension roller 1013 and an intermediate transfer belt driving roller 1014 by a primary transfer roller 1012 to which a voltage is applied by a primary transfer bias power source. The toner images of the respective colors are sequentially superimposed to form a color image on the intermediate transfer belt.

A transfer material 1019 is fed into the apparatus by a paper feed roller and is transported between the intermediate transfer belt 1015 and a secondary transfer roller 1016. A voltage is applied to the secondary transfer roller 1016 from a secondary transfer bias power source, and the color image on the intermediate transfer belt 1015 is transferred to the transfer material 1019. The transfer material 1019 to which the color image has been transferred is fixed by a fixing device 1018, and is discharged outside the apparatus to complete a printing operation.

On the other hand, the toner remaining on the photosensitive drum without being transferred is scraped off by the cleaning blade 105 and stored in the waste toner storage container 107, and the cleaned photosensitive drum 101 repeats the above steps. Further, the toner remaining on the primary transfer belt without being transferred is also scraped off by the cleaning device 1017.

According to one aspect of the present disclosure, it is possible to obtain an electroconductive member that can be used as a charging member, a developing member, or a transfer member that can stably charge a body to be charged even when applied to a high-speed electrophotographic image forming process. According to another aspect of the present disclosure, it is possible to obtain a process cartridge that contributes to the formation of a high-quality electrophotographic image. Further, according to still another aspect of the present disclosure, it is possible to obtain an electrophotographic image forming apparatus capable of forming a high-quality electrophotographic image.

EXAMPLES

Example 1

(1. Manufacture of Unvulcanized Rubber Mixture for Forming Domain (CMB))

[1-1. Preparation of Unvulcanized Rubber Mixture]

The materials indicated in Table 1 were mixed in the blending amounts indicated in Table 1 using a 6-liter pressure kneader (product name: TD6-15MDX, available from Toshin) to obtain CMB. The mixing conditions were a filling rate of 70 vol %, a blade rotation speed of 30 rpm, and 20 minutes of time duration.

TABLE 1

| | Raw material name | Blending amount (parts by mass) |
|---|---|---|
| Raw material rubber | Styrene butadiene rubber (Product name: TUFDENE 1000, available from Asahi Kasei Corporation) | 100 |
| Electronic electroconductive agent | Carbon black (Product name: TOKABLACK #5500, available from Tokai Carbon Co., Ltd.) | 80 |

TABLE 1-continued

| | Raw material name | Blending amount (parts by mass) |
|---|---|---|
| Vulcanization acceleration aid | Zinc oxide (Product name: Zinc oxide, available from Sakai Chemical Industry Co., Ltd.) | 5 |
| Processing aid | Zinc stearate (Product name: SZ-2000, available from Sakai Chemical Industry Co., Ltd.) | 2 |

[1-2. Preparation of Rubber Mixture for Forming Matrix (MRC)]

The materials indicated in Table 2 were mixed in the blending amounts indicated in Table 2 using a 6-liter pressure kneader (product name: TD6-15MDX, available from Toshin) to obtain MRC. The mixing conditions were a filling rate of 70 vol %, a blade rotation speed of 30 rpm, and 16 minutes of time duration.

TABLE 2

| | Raw material name | Blending amount (parts by mass) |
|---|---|---|
| Raw material rubber | Butyl rubber (Product name: JSR Butyl 065, available from JSR) | 100 |
| Filler | Calcium carbonate (Product name: NANOX #30, available from Maruo Calcium Co., Ltd.) | 70 |
| Vulcanization acceleration aid | Zinc oxide (Product name: Zinc oxide, available from Sakai Chemical Industry Co., Ltd.) | 7 |
| Processing aid | Zinc stearate (Product name: SZ-2000, available from Sakai Chemical Industry Co., Ltd.) | 2.8 |

[1-3. Preparation of Unvulcanized Rubber Mixture for Forming Electroconductive Layer]

The CMB and MRC obtained above were mixed in the blending amounts indicated in Table 3 using a 6-liter pressure kneader (product name: TD6-15MDX, available from Toshin). The mixing conditions were a filling rate of 70 vol %, a blade rotation speed of 30 rpm, and 16 minutes of time duration.

TABLE 3

| | Raw material name | Blending amount (parts by mass) |
|---|---|---|
| Raw material rubber | Unvulcanized domain composition | 25 |
| Raw material rubber | Unvulcanized matrix composition | 75 |

Next, a vulcanizing agent and a vulcanization accelerator indicated in Table 4 were added in the blending amount indicated in Table 4 with respect to 100 parts by mass of the mixture of CMB and MRC, and the mixture was mixed by using an open roll having a roll diameter of 12 inches (0.30 m) to prepare a rubber mixture for forming an electroconductive layer. The mixing conditions were such that by setting a rotation speed of a front roll to be 10 rpm and a rotation speed of a rear roll to be 8 rpm, and a roll gap to be 2 mm, the left and right sides were turned 20 times in total, and then by setting the roll gap to be 0.5 mm, thinning was performed 10 times.

TABLE 4

| | Raw material name | Blending amount (parts by mass) |
|---|---|---|
| Vulcanizing agent | Sulfur (Product name: SULFAX PMC, available from Tsurumi Chemical Industry Co., Ltd.) | 3 |
| Vulcanization aid | Tetrabenzyl thiuram disulfide (Product name: TBZTD, available from Sanshin Chemical Co., Ltd.) | 1 |

(2. Manufacture of Electroconductive Member)

[2-1. Preparation of Support Having Electroconductive Outer Surface]

As a support having an electroconductive outer surface, a round bar having a total length of 252 mm and an outer diameter of 6 mm was prepared by subjecting a surface of stainless steel (SUS) to electroless nickel plating.

[2-2. Molding of Electroconductive Layer]

A die with an inner diameter of 12.5 mm was attached to a tip of a crosshead extruder that has a supply mechanism of a support and a discharge mechanism of an unvulcanized rubber roller, the temperatures of the extruder and crosshead were set to 80° C., and a transport speed of the support was adjusted to 60 mm/sec. Under this condition, the rubber mixture for forming an electroconductive layer was supplied from the extruder, and an outer peripheral portion of the support was covered with the rubber mixture for forming an electroconductive layer in the crosshead to obtain an unvulcanized rubber roller.

Next, the unvulcanized rubber roller was put into a hot air vulcanizing furnace at 160° C., and the rubber mixture for forming an electroconductive layer was vulcanized by heating for 60 minutes to obtain a roller on which an electroconductive layer is formed on the outer peripheral portion of the support. After that, both ends of the electroconductive layer were cut off by 10 mm to set a length of an electroconductive layer portion in the longitudinal direction to be 231 mm.

Finally, the surface of the electroconductive layer was polished with a rotary grindstone. As a result, an electroconductive roller A1 having a crown shape with a diameter of 8.44 mm at a position of 90 mm from the central portion to both end sides and a central portion diameter of 8.5 mm was obtained.

(3. Characteristic Evaluation)

[3-1] Checking of Matrix-Domain Structure

Whether or not the matrix-domain structure was formed in the electroconductive layer was checked by the following method.

Using a razor, a slice was cut out so as to observe a cross section perpendicular to the longitudinal direction of the electroconductive layer of the electroconductive member. Next, a cross-sectional image was obtained by performing platinum vapor deposition, and taking a photograph at a magnification of 1,000 using a scanning electron microscope (SEM) (product name: S-4800, available from Hitachi High-Technologies Corporation).

The matrix-domain structure observed in the slice from the electroconductive layer indicates an aspect that in the cross-sectional image, domains are dispersed in the matrix as illustrated in FIG. 6, and the domains exist in an independent state without being connected to each other. On the other hand, the domain group in which the matrix is in a state of communicating with the image was checked.

Furthermore, in order to quantify the obtained photographed image, image processing software (product name: ImageProPlus, available from Media Cybernetics, Inc.) was used for the fracture surface image obtained by observation with SEM to perform 8-bit grayscale conversion, thereby obtaining a 256-tone monochrome image. Next, the black and white of the image was inverted so that the domain in the fracture surface became white, and a binarized image was obtained. By using a counting function for the binarized image, the number percent K of isolated domains that were not connected to each other as described above was calculated with respect to the total number of domains existing in the region of 50 μm square and having no contact with the frame line of the binarized image.

In a case where an arithmetic average value K (% by number) is more than 80 when an electroconductive layer of an electroconductive roller A1 (length in the longitudinal direction: 231 mm) is equally divided into five regions in the longitudinal direction, equally divided into four regions in the circumferential direction to manufacture a slice optionally from each region, 20 sections in total, and then the above measurement is performed on the sections, the matrix-domain structure is evaluated as "Presence", and a case where the arithmetic average value K (% by number) is less than 80, it is evaluated as "Absence", and Table 6-1 and Table 6-2 indicate the results of "presence or absence of sea-island structure".

[3-2] Measurement of slope from $1.0\times10^{5}$ Hz to $1.0\times10^{6}$ Hz and impedance from $1\times10^{-2}$ Hz to $1\times10^{1}$ Hz The following measurements were performed to evaluate the slope of the impedance from $1.0\times10^{5}$ to $1.0\times10^{6}$ Hz and the impedance from $1.0\times10^{-2}$ Hz to $1.0\times10^{1}$ Hz, in the electroconductive member.

First, as a pretreatment, vacuum platinum vapor deposition was performed on the electroconductive roller A1 while rotating to form a measurement electrode. At this time, a masking tape was used to form a strip-shaped electrode having a width of 1.5 cm in the longitudinal direction and uniform in the circumferential direction. By forming the electrode, the influence of the contact resistance between the measurement electrode and the electroconductive member can be eliminated as much as possible due to the surface roughness of the electroconductive member. Next, an aluminum sheet was wound around the electrode without any gap to form a measurement electrode on the electroconductive member side.

FIG. 11 illustrates a schematic diagram of a state where a measurement electrode is formed on an electroconductive roller. In FIG. 11, 111 is an electroconductive support, 112 is an electroconductive layer having a matrix-domain structure, 113 is a platinum vapor deposition layer, and 114 is an aluminum sheet.

Figure 12:
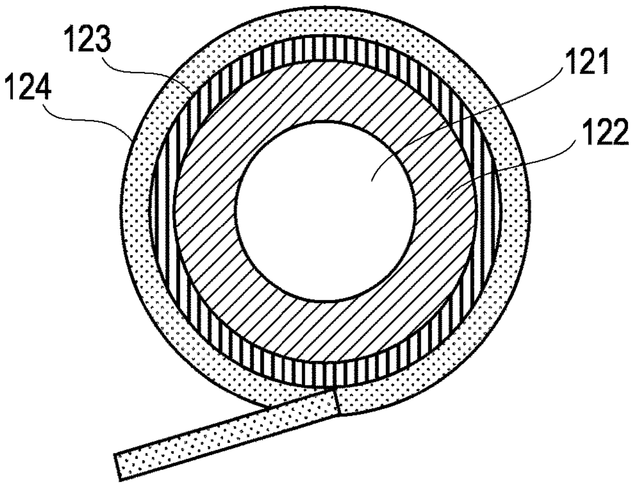
FIG. 12 is a sectional view of a measurement electrode.

FIG. 12 illustrates a sectional view of a state where the measurement electrode is formed on an electroconductive member. 121 is an electroconductive support, 122 is an electroconductive layer having a matrix-domain structure, 123 is a platinum vapor deposition layer, and 124 is an aluminum sheet. As illustrated in FIG. 12, it is important that the electroconductive support and the measurement electrode sandwich the electroconductive layer having a matrix-domain structure.

Figure 13:
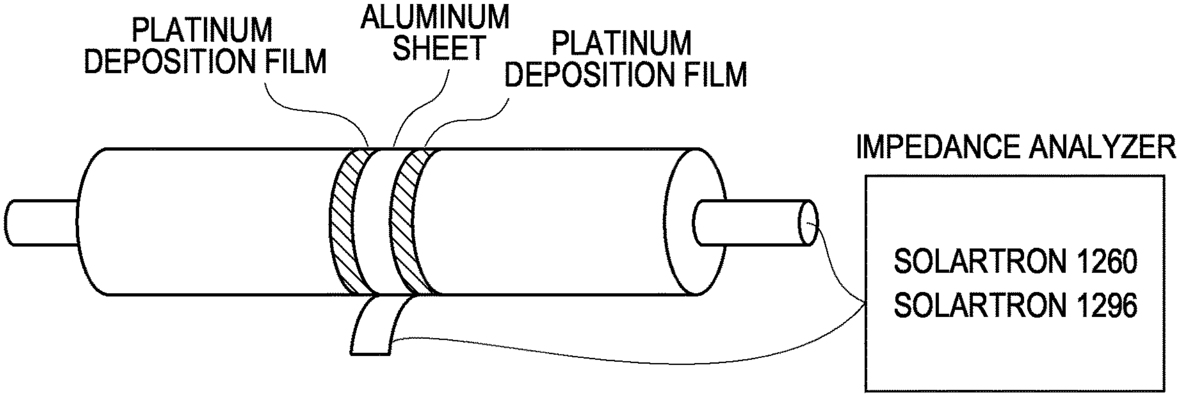
FIG. 13 is a schematic diagram of an impedance measurement system.

Then, the aluminum sheet was connected to the measurement electrode on the side of the impedance measuring device (Solartron 1260 and Solartron 1296, available from Solartron). FIG. 13 illustrates a schematic diagram of this measurement system. Impedance measurement was performed by using an electroconductive support and an aluminum sheet as two electrodes for measurement.

When measuring the impedance, the electroconductive roller A1 was left in an environment of a temperature of 23° C. and a humidity of 50% RH for 48 hours to saturate the water content of the electroconductive member A1.

Impedance measurement was performed at a temperature of 23° C. and a humidity of 50% RH at an AC voltage with an amplitude of 1 Vpp and a frequency of from $1.0\times10^{-2}$ Hz to $1.0\times10^{7}$ Hz (when the frequency changes by one digit, five points each are measured) to obtain the absolute value of impedance. Then, the measurement result was plotted in logarithmic log of the absolute value of the impedance and the frequency using a spreadsheet software such as Excel (registered trademark). From the graph obtained by the logarithmic log plot, the arithmetic average value of each of (a) the slope from $1.0\times10^{5}$ Hz to $1.0\times10^{6}$ Hz and (b) the absolute value of impedance from $1.0\times10^{-2}$ Hz to $1.0\times10^{1}$ Hz was calculated. Regarding the measurement position, the electroconductive layer of the electroconductive roller A1 (length in the longitudinal direction: 230 mm) was equally divided into five regions in the longitudinal direction to form a measurement electrode optionally from each region, five measurement electrodes in total, and then the above measurement and calculation of the arithmetic average value were performed. The evaluation results are indicated in Table 6-1 and Table 6-2 as the results of "(a) slope" and "(b) impedance" of the electroconductive layer.

[3-3] Measurement of Impedance from $1.0\times10^{-2}$ Hz to $1.0\times10^{1}$ Hz for Electroconductive Support The impedance measurement from $1.0\times10^{-2}$ Hz to $1.0\times10^{1}$ Hz was performed in the same manner as in [3-3] on the electroconductive support of the electroconductive roller A1 with the electroconductive layer peeled off. The evaluation results are indicated in Table 6-1 and Table 6-2 as "impedance" of the electroconductive support.

[3-4] Measurement of Volume Resistivity of Matrix

The following measurements were performed to evaluate the volume resistivity of the matrix contained in the electroconductive layer. A scanning probe microscope (SPM) (product name: Q-Scope250, available from Quesant Instrument Corporation) was operated in contact mode. First, from the electroconductive elastic layer of the electroconductive roller A1, a microtome (product name: Leica EM FCS, available from Leica Microsystems) was cut out as an ultrathin slice with a thickness of 1 μm at a cutting temperature of −100° C. When the ultrathin slices were cut out, the direction of the cross section perpendicular to the longitudinal direction of the electroconductive member was set in consideration of the direction in which electric charges are transported for discharge.

Next, in an environment with a temperature of 23° C. and a humidity of 50% RH, the ultrathin slice was placed on a metal plate, a part that is in direct contact with the metal plate was selected, and a part corresponding to the matrix was brought into contact with a SPM cantilever, a voltage of 50 V was applied to the cantilever for five seconds, the current value was measured, and the arithmetic average value for five seconds was calculated.

The surface shape of the measurement slice was observed with the SPM, and the thickness of the measurement location was calculated from the obtained height profile. Further, a recess area of the contact portion of the cantilever was calculated from the observation result of the surface shape. The volume resistivity was calculated from the thickness and the recess area to obtain the volume resistivity of the matrix.

The electroconductive layer of the electroconductive roller A1 (longitudinal direction length: 230 mm) was equally divided into five regions in the longitudinal direction, equally divided into four regions in the circumferential direction to manufacture a slice optionally from each region, 20 slices in total, and then the above measurement was performed on the sections. The average value was used as the volume resistivity of the matrix. The evaluation results are indicated in Table 6-1 and Table 6-2 as "volume resistivity" of the matrix.

[3-5] Measurement of Volume Resistivity of Domain

In order to evaluate the volume resistivity of the domain contained in the electroconductive layer, the volume resistivity of the domain was measured by the same method except that in the measurement of the volume resistivity of the above matrix, the measurement is performed at a location corresponding to the domain of the ultrathin slice, and the voltage for measurement was set to be 1 V. The evaluation results are indicated in Table 6-1 and Table 6-2 as "volume resistivity" of the domain.

[3-6] Evaluation of Domain Shape

The shape of the domain contained in the electroconductive layer was evaluated by a method of quantifying an observation image obtained by the following scanning electron microscope (SEM) by image processing.

A thin piece having a thickness of 1 mm was cut out by the same method as in [3-4] Measurement of the volume resistivity of the matrix. At this time, the thin piece acquired a plane perpendicular to the axis of the electroconductive support and a fracture surface of a cross section parallel to the plane. The cut-out positions from the electroconductive layer were set as three positions of, when the length of the electroconductive layer in the longitudinal direction is defined as L, the center in the longitudinal direction, and L/4 from both ends of the electroconductive layer toward the center. Platinum was vapor-deposited on the slice to obtain a vapor-deposited slice. Next, an observation image was obtained by taking a photograph of the surface of the vapor-deposited slice at a magnification of 1,000 using a scanning electron microscope (SEM) (product name: S-4800, available from Hitachi High-Technologies Corporation).

Next, when the thickness of the electroconductive layer is defined as T, a 15 μm square region at any three locations, for each of the three slices obtained from the three measurement positions, nine locations in total, in the thickness region from the outer surface of the electroconductive layer to the depth of from 0.1 T to 0.9 T was extracted as an analysis image.

Next, in order to quantify the shape of the domain in the analysis image, image processing software "ImageProPlus" (product name, available from Media Cybernetics, Inc.) was used to perform 8-bit grayscale conversion, thereby obtaining a 256-tone monochrome image. Next, the black and white of the image was inverted so that the domain in the fracture surface became white, and a binarized image was obtained. Next, the following items were calculated for the domain group existing in the binarized image by the counting function for the binarized image.

Perimeter A (μm)

Envelope perimeter B (μm)

By substituting these values into the following Equation (5), the ratio of the number of domains satisfying the condition of Equation (5) was calculated as the number % with respect to the total number of domain groups in each evaluation image, and further, the average value of the nine evaluation images was calculated and used as an index of the domain shape. The results are indicated in Table 6-1 and Table 6-2. In Tables 6-1 and 6-2, the value obtained by substituting in Equation (5) is the "perimeter ratio A/B", and the proportion of domains that satisfy the Equation (5) is indicated as the "shape index".

$$1.00 \leq AB \leq 1.10 \qquad \text{Equation (5)}$$

(A: Perimeter of Domain, B: Envelope Perimeter of Domain)

[3-7] Cross-sectional area ratio of electronic electroconductive material in domain, the cross-sectional area ratio of the electronic electroconductive material in the domain, which is correlated with the irregular shape of the circumferential surface of the domain measured for the uniformity of the volume resistivity of the domain, and variation of a cross-sectional area ratio of the electronic electroconductive material in the domain, which is correlated with the uniformity of the volume resistivity of the domain, were measured.

A thin piece for observation was cut out by the same method as the measurement of the domain shape in [3-6] so as to obtain an observation image by taking a photograph of the fracture surface at a magnification of 5,000 using a scanning electron microscope (SEM) (product name: S-4800, available from Hitachi High-Technologies Corporation). Then, the image processing software "ImagePro-Plus" (product name, available from Media Cybernetics, Inc.) was used to binarize the observation image so that the carbon black particles can be distinguished, and by using the counting function, the cross-sectional area S of the domain in the analysis image and the total Sc of the cross-sectional areas of the carbon black particles as the electronic electroconductive agent contained in the domain were calculated. Then, σr/μr was calculated from the arithmetic average value μr of Sc/S as the cross-sectional area ratio of the electronic electroconductive material in the domain, μr and the standard deviation σr of μr as an index of the uniformity of the volume resistivity of the domain.

In the calculation of μr and σr, when the thickness of the electroconductive layer is defined as T, a 15 μm square region at any three locations, for each of the three slices obtained from the three measurement positions, nine locations in total, in the thickness region from the outer surface of the electroconductive layer to the depth of from 0.1 T to 0.9 T was extracted as an analysis image. The measurement was performed in the extracted regions, and the arithmetic average value obtained from the nine regions was calculated. The evaluation results are indicated in Table 6-1 and Table 6-2 as "electronic electroconductive material cross-sectional area ratio μr of domain" and "domain volume resistivity uniformity σr/μr".

[3-8] Measurement of Domain Size

The measurement of domain size was performed in such a manner that the observation image at a magnification of 5,000 obtained by the measurement of the uniformity of volume resistivity of the domain in [3-7] described above was binarized by the image processing software "ImagePro-Plus" (product name, available from Media Cybernetics), and quantified by the counting function so as to calculate the cross-sectional area S of the domain group. Next, an equivalent circle diameter D was calculated from the cross-sectional area S of each domain. Specifically, $D=(S/2\pi r)^{0.5}$ was calculated using the area S of the domain.

In the domain size measurement, when the thickness of the electroconductive layer is defined as T, a 50 μm square region at any three locations, for each of the three slices obtained from the three measurement positions, nine locations in total, in the thickness region from the outer surface of the electroconductive layer to the depth of from 0.1 T to 0.9 T was extracted as an analysis image. The measurement was performed in the extracted regions, and the arithmetic average value from the nine regions was calculated. The results are indicated in Table 6-1 and Table 6-2 as "Equivalent circle diameter D".

[3-9] Measurement of Particle Size Distribution of the Domain

The particle size distribution of the domain was measured as follows to evaluate the uniformity of the domain size. First, a binarized image was obtained using the image processing software "ImageProPlus" (product name, available from Media Cybernetics) on the observation image at a magnification of 5,000 obtained by the [3-8] measurement of domain size with a scanning electron microscope (product name: S-4800, available from Hitachi High-Technologies Corporation). Next, for the binarized image, the average value D and the standard deviation ad were calculated for the domain group in the binarized image, and then σd/D, which is an index of the particle size distribution, was calculated.

In the measurement of σd/D particle size distribution of the domain size, when the thickness of the electroconductive layer is defined as T, a 50 μm square region at any three locations, for each of the three slices obtained from the three measurement positions, nine locations in total, in the thickness region from the outer surface of the electroconductive layer to the depth of from 0.1 T to 0.9 T was extracted as an analysis image to calculate an arithmetic average value at nine locations. The evaluation results are indicated in Table 6-1 and Table 6-2 as "particle size distribution ad/D" of the domain.

[3-10] Measurement of Inter-Domain Surface Distances

The following measurements were performed to evaluate the inter-domain surface distances.

The distance between the domains is, first, a binarized image was obtained using the image processing software LUZEX (available from Nireco Corporation) on the observation image at a magnification of 5,000 obtained by the [3-8] measurement of domain size with a scanning electron microscope (product name: S-4800, available from Hitachi High-Technologies Corporation). Then, for the binarized image, the distribution of the distances between the wall surfaces of the domain was calculated, and then the arithmetic average value of the distribution was calculated.

In the measurement of inter-domain surface distances, when the thickness of the electroconductive layer is defined as T, a 50 μm square region at any three locations, for each of the three slices obtained from the three measurement positions, nine locations in total, in the thickness region from the outer surface of the electroconductive layer to the depth of from 0.1 T to 0.9 T was extracted as an analysis image to calculate an arithmetic average value at nine locations. The evaluation results are indicated in Table 6-1 and Table 6-2 as the "inter-domain surface distances" of the matrix.

[3-11] Measurement of Uniformity of Inter-Domain Surface Distances

The uniformity of the inter-domain surface distances was performed as follows. First, a binarized image was obtained using the image processing software LUZEX (available from Nireco Corporation) on the observation image at a magnification of 5,000 obtained by the [3-9] measurement of domain size with a scanning electron microscope (product name: S-4800, available from Hitachi High-Technologies Corporation). Next, for the binarized image, the arithmetic average value Dm and the standard deviation σm were calculated from the distribution of the distance between the wall surfaces of the domains, and then σm/Dm, which is an index of the uniformity of the distance between the domains, was calculated.

In the measurement of σm/Dm, which is an index of the uniformity of the distance between the domains, when the thickness of the electroconductive layer is defined as T, a 50 μm square region at any three locations, for each of the three slices obtained from the three measurement positions, nine locations in total, in the thickness region from the outer surface of the electroconductive layer to the depth of from 0.1 T to 0.9 T was extracted as an analysis image to calculate an arithmetic average value at nine locations. The evaluation results are indicated in Table 6-1 and Table 6-2 as "uniformity of inter-domain surface distances σm/Dm" of the matrix.

[3-12] Measurement of Volume Fraction

The volume fraction of the domain was calculated by measuring the electroconductive layer in three dimensions using FIB-SEM.

Specifically, a slice image group was obtained by repeating cross-section exposure by a focused ion beam and SEM observation by using FIB-SEM (available from FEI) (details described above).

The obtained image was three-dimensionally constructed in a matrix-domain structure using 3D visualization/analysis software Avizo (available from FEI). Next, the analysis software discriminated the matrix-domain structure by binarization.

Furthermore, in order to quantify the volume fraction, the volume of the domain contained in any sample of cubic shape with a side of 10 μm in the three-dimensional image was calculated.

In the measurement of the volume fraction of the domain, when the thickness of the electroconductive layer is defined as T, a cubic shape with a side of 10 μm at any three locations, for each of the three slices obtained from the three measurement positions, nine locations in total, in the thickness region from the outer surface of the electroconductive layer to the depth of from 0.1 T to 0.9 T was extracted as a sample to calculate an arithmetic average value at nine locations. The evaluation results are indicated in Table 6-1 and Table 6-2 as "domain volume fraction".

(4. Image Evaluation)

[4-1] Evaluation of Charging Ability

The following evaluations were performed in order to check the function of suppressing discharge omission of the electroconductive roller A1. First, as an electrophotographic apparatus, an electrophotographic laser printer (product name: Laserjet M608dn, available from HP) was prepared. Next, the electroconductive roller A1, the electrophotographic apparatus, and the process cartridge were left in an environment of 23° C. and 50% RH for 48 hours for the purpose of adjusting to the measurement environment.

In order to evaluate in a high-speed process, the laser printer was modified so that the number of output sheets per unit time was 75 sheets/minute with A4 size paper, which was larger than the number of original output sheets. At that time, the output speed of the recording medium was 370 mm/sec and the image resolution was 1,200 dpi. Further, the pre-exposure device in the laser printer was removed.

Further, the process cartridge was modified and a surface potential probe (main body: Model 347, Trek Corp. probe: Model 3800S-2) was installed so as to measure the drum surface potential after the charging process.

The electroconductive roller A1 left in the above environment was set as a charging roller of the process cartridge and incorporated into a laser printer.

Under the same environment as above, by an external power supply (Trek615 available from Trek Japan), a voltage of −1000 V was applied to the electroconductive roller A1 to measure the surface potential of the photosensitive drum when outputting a solid white image and a solid black image. Then, a difference in surface potential of the photosensitive drum after the charging process when the solid black image was output and when the solid white image was output was calculated as the charging ability of the electroconductive roller A1. The evaluation results are indicated in Table 6-1 and Table 6-2 as "black and white potential difference".

[4-2] Ghost Image Evaluation

The effect of forming a uniform discharge against the unevenness of the surface potential of the photosensitive drum before charging in the high-speed process of the electroconductive roller A1 was checked by the following method.

The laser printer used in the above "Evaluation of charging ability" was used to form an evaluation image. Similar to the above "Evaluation of charging ability", the electroconductive roller A1, the laser printer, and the process cartridge are left in the environment of 23° C. 50% RH for 48 hours for the purpose of adjusting to the measurement environment, so that an evaluation image was formed under the same environment.

The evaluation image had an "E" letter at the top of the image and a halftone image from the center to the bottom of the image.

Figure 14:
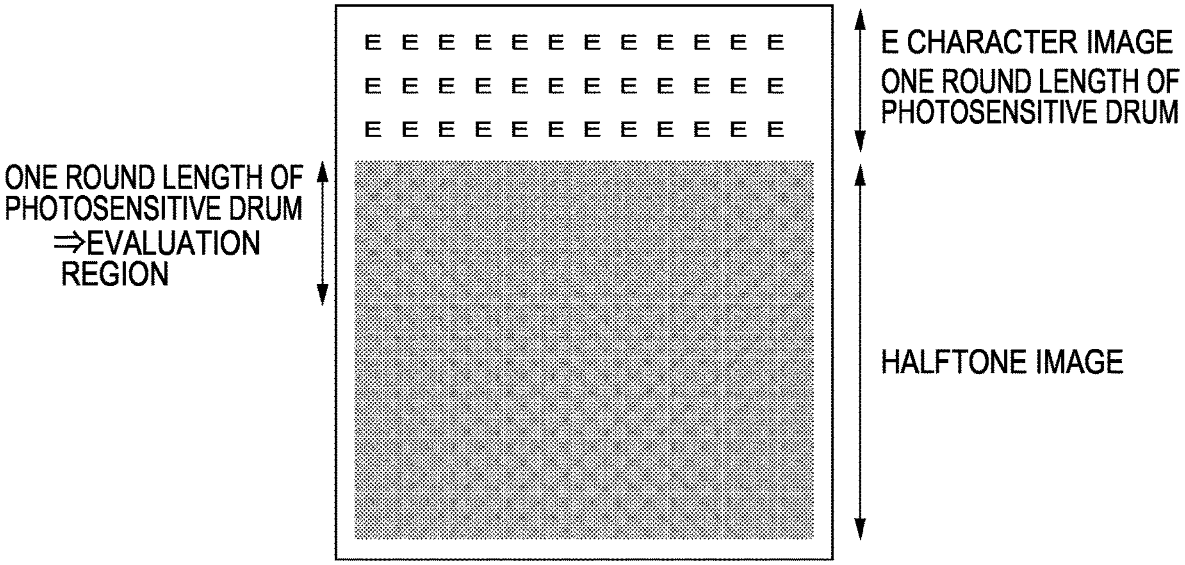
FIG. 14 is a schematic diagram of an image for evaluating a ghost image.

Specifically, the top 10 cm of the image was an image in which the letter "E" in the alphabet of 4 points in size was printed so that the coverage was 4% with respect to the area of A4 size paper. As a result, after the transfer process, that is, before the charging process, the surface potential of the photosensitive drum can be uneven in the region of about one round of the photosensitive drum along the surface potential corresponding to the first letter "E". FIG. 14 illustrates an explanatory diagram of the evaluation image.

Furthermore, a halftone image (an image in which a horizontal line having a width of one dot and a distance of two dots is drawn in the direction perpendicular to the rotation direction of the photosensitive drum) was output from the lower part of 10 cm. This halftone image was visually observed and evaluated according to the following criteria. The results are indicated in Table 6-1 and Table 6-2.

[Evaluation of "E" Letter on Halftone Image]

Rank A: No image unevenness derived from the letter "E" is observed on the halftone image even when observed with a microscope.

Rank B: Although there is no image unevenness derived from the letter "E" on a part of the halftone image by visual observation, image unevenness derived from the letter "E" is observed with a microscope.

Rank C: An image of the letter "E" is visually observed on part on the halftone image.

Rank D: An image of the letter "E" is visually observed on the entire surface of the halftone image.

Example 2 to Example 38

Electroconductive members A2 to A38 are manufactured in the same manner as in Example 1 except that the materials and conditions indicated in Tables 5A-1 to 5A-4 are used for the raw rubber, the electroconductive agent, the vulcanizing agent, and the vulcanization accelerator.

For details of the materials indicated in Tables 5A-1 to 5A-4, the rubber material is indicated in Table 5B-1, the electroconductive agent is indicated in Table 5B-2, and the vulcanizing agent and accelerator are indicated in Table 5B-3.

Further, in Example 36, using a compound available from Toho Tenax (product name: rPEEK CF30), it is possible to mold into a round bar type which can be molded in the same shape as the support in Example 1 at a mold temperature of 380° C. A round bar made of the obtained electroconductive resin (total length 252 mm, outer diameter 6 mm) was used as a support.

In Example 37, the following adhesive (metalloc (metalloc N-33, available from Toyo Kagaku Kenkyusho Co., Ltd., diluted with methyl isobutyl ketone at 25% by weight) was applied by a roll coater over the entire circumference in the range of 230 mm including the central portion excluding the both ends 11 mm in the longitudinal direction of the outer peripheral surface of the round bar made of the electroconductive resin molded in the same manner as in Example 36. After application, the adhesive was baked by heating at 180° C. for 30 minutes. In Example 37, the round bar with a primer layer thus obtained was used as a support.

In Example 38, 35% by weight of a phenol resin (product name: PR-50716 available from Sumitomo Bakelite Co., Ltd.) and 5% by weight of hexamethylenetetramine (product name: urotropine available from Sumitomo Seika Chemical Co., Ltd.) were heated for 3 minutes with a heating roll at 90° C., and after melt-kneading, the mixture was taken out, crushed, and the molding material crushed into granules was injection-molded at a mold temperature of 175° C. to mold a round bar. The whole outer surface of the obtained round bar made of an insulating resin was subjected to platinum vapor deposition and used as a support.

For each charging member obtained in Examples 2 to 38, the same items as in Example 1 were measured and evaluated. The obtained results are indicated in Table 6-1 and Table 6-2.

Figure 15:
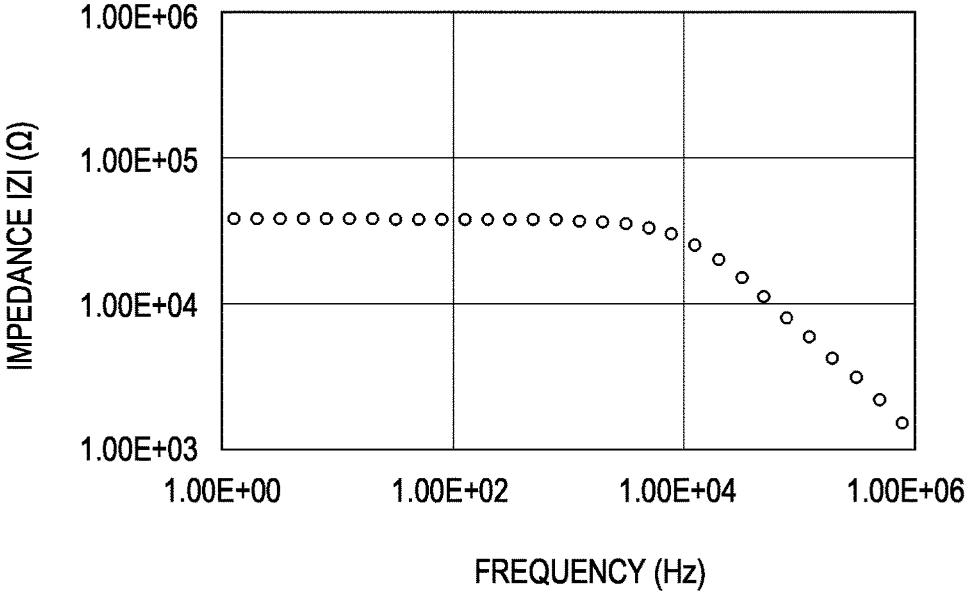
FIG. 15 is a diagram illustrating a logarithmic log plot obtained in Example 22.

The logarithmic log plot obtained in Example 22 is illustrated in FIG. 15.

TABLE 5A-1

| | Electroconductive support | | Unvulcanized domain rubber composition | | | | | | | | |
|---|---|---|---|---|---|---|---|---|---|---|---|
| | | | Raw material rubber type | | | | Electroconductive agent | | | Dispersion | |
| | Type | Electroconductive surface | Material abbreviation | | SP value | Mooney viscosity | Type | Parts by mass | DBP | time min | Mooney viscosity |
| Example 1 | SUS | Ni plating | SBR | T1000 | 16.8 | 45 | #5500 | 80 | 155 | 30 | 84 |
| Example 2 | SUS | Ni plating | SBR | T1000 | 16.8 | 45 | #7360 | 100 | 87 | 30 | 85 |
| Example 3 | SUS | Ni plating | SBR | T1000 | 16.8 | 45 | #5500 | 80 | 155 | 30 | 82 |

TABLE 5A-1-continued

| | Electroconductive support | | Unvulcanized domain rubber composition | | | | | | | | |
|---|---|---|---|---|---|---|---|---|---|---|---|
| | | | Raw material rubber type | | | | Electroconductive agent | | | Dispersion | |
| | Type | Electroconductive surface | Material | abbreviation | SP value | Mooney viscosity | Type | Parts by mass | DBP | time min | Mooney viscosity |
| Example 4 | SUS | Ni plating | SBR | T1000 | 16.8 | 45 | #5500 | 80 | 155 | 30 | 83 |
| Example 5 | SUS | Ni plating | SBR | T1000 | 16.8 | 45 | #5500 | 80 | 155 | 30 | 85 |
| Example 6 | SUS | Ni plating | SBR | T1000 | 16.8 | 45 | #5500 | 80 | 155 | 30 | 84 |
| Example 7 | SUS | Ni plating | BR | T0700 | 17.1 | 43 | #5500 | 100 | 155 | 30 | 89 |
| Example 8 | SUS | Ni plating | BR | T0700 | 17.1 | 43 | #5500 | 100 | 155 | 30 | 90 |
| Example 9 | SUS | Ni plating | BR | T0700 | 17.1 | 43 | #5500 | 100 | 155 | 30 | 89 |
| Example 10 | SUS | Ni plating | BR | T0700 | 17.1 | 43 | #5500 | 80 | 155 | 30 | 86 |
| Example 11 | SUS | Ni plating | BR | T0700 | 17.1 | 43 | #5500 | 60 | 155 | 30 | 71 |
| Example 12 | SUS | Ni plating | Butyl | JSR Butyl 065 | 15.8 | 32 | #5500 | 80 | 155 | 30 | 74 |
| Example 13 | SUS | Ni plating | Butyl | JSR Butyl 065 | 15.8 | 32 | #5500 | 82 | 155 | 30 | 81 |
| Example 14 | SUS | Ni plating | Butyl | JSR Butyl 065 | 15.8 | 32 | #5500 | 85 | 155 | 30 | 85 |
| Example 15 | SUS | Ni plating | Butyl | JSR Butyl 065 | 15.8 | 32 | #5500 | 90 | 155 | 30 | 90 |
| Example 16 | SUS | Ni plating | Butyl | JSR Butyl 065 | 15.8 | 32 | #5500 | 80 | 155 | 30 | 77 |
| Example 17 | SUS | Ni plating | Butyl | JSR Butyl 065 | 15.8 | 32 | #5500 | 80 | 155 | 30 | 76 |
| Example 18 | SUS | Ni plating | Butyl | JSR Butyl 065 | 15.8 | 32 | #5500 | 60 | 155 | 30 | 73 |
| Example 19 | SUS | Ni plating | Butyl | JSR Butyl 065 | 15.8 | 32 | #5500 | 40 | 155 | 30 | 65 |
| Example 20 | SUS | Ni plating | NBR | N230S | 20 | 32 | #7360 | 60 | 87 | 30 | 65 |
| Example 21 | SUS | Ni plating | NBR | N230S | 20 | 32 | #7360 | 40 | 87 | 30 | 55 |

TABLE 5A-2

| | Unvulcanized matrix rubber composition | | | | | | | Unvulcanized rubber composition | | Unvulcanized rubber dispersion | | Vulcanizing agent | | Vulcanization accelerator | |
|---|---|---|---|---|---|---|---|---|---|---|---|---|---|---|---|
| | Raw material rubber type | | | | Electroconductive agent | | | Domain | Matrix | Rotation | Kneading | | | | |
| | Material | abbreviation | SP value | Mooney viscosity | Type | Parts by mass | Mooney viscosity | Parts by mass | Parts by mass | speed rpm | time min | Material abbreviation | Parts by mass | Material abbreviation | Parts by mass |
| Example 1 | Butyl | JSR Butyl 065 | 15.8 | 32 | — | — | 40 | 15 | 85 | 30 | 20 | Sulfur | 3 | TT | 3 |
| Example 2 | Butyl | JSR Butyl 065 | 15.8 | 32 | — | — | 40 | 15 | 85 | 30 | 20 | Sulfur | 3 | TT | 3 |
| Example 3 | Butyl | JSR Butyl 065 | 15.8 | 32 | — | — | 41 | 20 | 80 | 30 | 20 | Sulfur | 3 | TT | 3 |
| Example 4 | Butyl | JSR Butyl 065 | 15.8 | 32 | — | — | 38 | 22 | 78 | 30 | 20 | Sulfur | 3 | TT | 3 |
| Example 5 | Butyl | JSR Butyl 065 | 15.8 | 32 | — | — | 39 | 25 | 75 | 30 | 20 | Sulfur | 3 | TT | 3 |
| Example 6 | EPDM | Esplene301A | 17 | 44 | — | — | 50 | 20 | 80 | 30 | 20 | Sulfur | 3 | TET | 1 |
| Example 7 | SBR | T1000 | 16.8 | 45 | — | — | 54 | 20 | 80 | 30 | 20 | Sulfur | 3 | TBZTD | 1 |
| Example 8 | SBR | T2003 | 17 | 45 | — | — | 53 | 20 | 80 | 30 | 20 | Sulfur | 3 | TBZTD | 1 |
| Example 9 | SBR | A303 | 17 | 46 | — | — | 55 | 20 | 80 | 30 | 20 | Sulfur | 3 | TBZTD | 1 |
| Example 10 | EPDM | Esplene301A | 17 | 44 | — | — | 52 | 20 | 80 | 30 | 20 | Sulfur | 3 | TET | 3 |
| Example 11 | EPDM | Esplene301A | 17 | 44 | — | — | 51 | 20 | 80 | 30 | 20 | Sulfur | 3 | TET | 3 |
| Example 12 | EPDM | Esplene301A | 17 | 44 | — | — | 51 | 22 | 78 | 30 | 20 | Sulfur | 3 | TET | 3 |
| Example 13 | EPDM | Esplene301A | 17 | 44 | — | — | 53 | 22 | 78 | 30 | 20 | Sulfur | 3 | TET | 3 |
| Example 14 | EPDM | Esplene301A | 17 | 44 | — | — | 52 | 22 | 78 | 30 | 20 | Sulfur | 3 | TET | 3 |
| Example 15 | EPDM | Esplene301A | 17 | 44 | — | — | 51 | 22 | 78 | 30 | 20 | Sulfur | 3 | TET | 3 |
| Example 16 | SBR | T1000 | 16.8 | 45 | — | — | 52 | 22 | 78 | 30 | 20 | Sulfur | 2 | TT | 2 |
| Example 17 | SBR | A303 | 17 | 46 | — | — | 52 | 22 | 78 | 30 | 20 | Sulfur | 2 | TT | 2 |
| Example 18 | EPDM | Esplene301A | 17 | 44 | — | — | 50 | 22 | 78 | 30 | 20 | Sulfur | 3 | TET | 3 |
| Example 19 | EPDM | Esplene301A | 17 | 44 | — | — | 49 | 22 | 78 | 30 | 20 | Sulfur | 3 | TET | 3 |
| Example 20 | EPDM | Esplene301A | 17 | 44 | — | — | 52 | 25 | 75 | 30 | 20 | Sulfur | 3 | TET | 3 |
| Example 21 | EPDM | Esplene301A | 17 | 44 | — | — | 49 | 25 | 75 | 30 | 20 | Sulfur | 3 | TET | 3 |

TABLE 5A-3

| | Electroconductive support | | Unvulcanized domain rubber composition | | | | | | | | |
|---|---|---|---|---|---|---|---|---|---|---|---|
| | | | Raw material rubber type | | | | Electroconductive agent | | | | |
| | Type | Electroconductive surface | Material abbreviation | | SP value | Mooney viscosity | Type | Parts by mass | DBP | Dispersion time min | Mooney viscosity |
| Example 22 | SUS | Ni plating | NBR | N230S | 20 | 32 | #7360 | 60 | 87 | 30 | 66 |
| Example 23 | SUS | Ni plating | NBR | N230S | 20 | 32 | #7360 | 40 | 87 | 30 | 58 |
| Example 24 | SUS | Ni plating | NBR | N230S | 20 | 32 | #7360 | 60 | 87 | 30 | 68 |
| Example 25 | SUS | Ni plating | SBR | T2100 | 17 | 78 | #5500 | 80 | 155 | 30 | 105 |
| Example 26 | SUS | Ni plating | NBR | DN401LL | 17.4 | 32 | #5500 | 60 | 155 | 30 | 72 |
| Example 27 | SUS | Ni plating | SBR | T2100 | 17 | 78 | #5500 | 40 | 155 | 30 | 95 |
| Example 28 | SUS | Ni plating | NBR | DN401LL | 17.4 | 32 | #5500 | 40 | 155 | 30 | 70 |
| Example 29 | SUS | Ni plating | NBR | N202S | 20.4 | 57 | #7360 | 60 | 87 | 30 | 86 |
| Example 30 | SUS | Ni plating | NBR | N202S | 20.4 | 57 | #7360 | 60 | 87 | 30 | 85 |
| Example 31 | SUS | Ni plating | NBR | N202S | 20.4 | 57 | #7360 | 40 | 87 | 30 | 65 |
| Example 32 | SUS | Ni plating | NBR | N202S | 20.4 | 57 | #7360 | 40 | 87 | 30 | 66 |
| Example 33 | SUS | Ni plating | NBR | N202S | 20.4 | 57 | #7360 | 60 | 87 | 30 | 84 |
| Example 34 | SUS | Ni plating | NBR | N202S | 20.4 | 57 | #7360 | 60 | 87 | 10 | 84 |
| Example 35 | SUS | Ni plating | NBR | N202S | 20.4 | 57 | #5500 | 40 | 87 | 30 | 75 |
| Example 36 | Electroconductive resin core metal | — | Butyl | JSR Butyl 065 | 15.8 | 32 | #5500 | 80 | 155 | 30 | 78 |
| Example 37 | Electroconductive resin core metal | Primer | Butyl | JSR Butyl 065 | 15.8 | 32 | #5500 | 80 | 155 | 30 | 80 |
| Example 38 | Insulating resin core metal | Primer | Butyl | JSR Butyl 065 | 15.8 | 32 | #5500 | 80 | 155 | 30 | 79 |

TABLE 5A-4

| | Unvulcanized matrix rubber composition | | | | | | | Unvulcanized rubber composition | | Unvulcanized rubber dispersion | | Vulcanizing agent | | Vulcanization accelerator | |
|---|---|---|---|---|---|---|---|---|---|---|---|---|---|---|---|
| | Raw material rubber type | | | | Electroconductive agent | | | Domain | Matrix | Number | Kneading | | | | |
| | Material abbreviation | | SP value | Mooney viscosity | Type | Parts by mass | Mooney viscosity | Parts by mass | Parts by mass | of rotations rpm | time min | Material abbreviation | Parts by mass | Material abbreviation | Parts by mass |
| Example 22 | SBR | A303 | 17 | 46 | — | — | 51 | 25 | 75 | 30 | 20 | Sulfur | 3 | TBZTD | 1 |
| Example 23 | SBR | A303 | 17 | 46 | — | — | 51 | 25 | 75 | 30 | 20 | Sulfur | 3 | TBZTD | 1 |
| Example 24 | EPDM | Esplene301A | 17 | 44 | — | — | 49 | 25 | 75 | 30 | 20 | Sulfur | 3 | TET | 3 |
| Example 25 | EPDM | Esplene301A | 17 | 44 | — | — | 48 | 15 | 85 | 30 | 20 | Sulfur | 3 | TET | 3 |
| Example 26 | SBR | A303 | 17 | 46 | — | — | 50 | 15 | 85 | 30 | 20 | Sulfur | 3 | TBZTD | 1 |
| Example 27 | EPDM | Esplene301A | 17 | 44 | — | — | 51 | 15 | 85 | 30 | 20 | Sulfur | 3 | TET | 3 |
| Example 28 | SBR | A303 | 17 | 46 | — | — | 52 | 15 | 85 | 30 | 20 | Sulfur | 3 | TBZTD | 1 |
| Example 29 | EPDM | Esplene505A | 16 | 47 | — | — | 52 | 25 | 75 | 30 | 20 | Sulfur | 3 | TET | 3 |
| Example 30 | SBR | T1000 | 16.8 | 45 | — | — | 50 | 25 | 75 | 30 | 20 | Sulfur | 3 | TBZTD | 1 |
| Example 31 | EPDM | Esplene505A | 16 | 47 | — | — | 51 | 25 | 75 | 30 | 20 | Sulfur | 3 | TET | 3 |
| Example 32 | SBR | T1000 | 16.8 | 45 | — | — | 52 | 25 | 75 | 30 | 20 | Sulfur | 3 | TBZTD | 1 |
| Example 33 | SBR | T1000 | 16.8 | 45 | — | — | 51 | 25 | 75 | 30 | 10 | Sulfur | 3 | TBZTD | 1 |
| Example 34 | SBR | T1000 | 16.8 | 45 | — | — | 42 | 25 | 75 | 30 | 20 | Sulfur | 3 | TBZTD | 1 |
| Example 35 | SBR | T1000 | 16.8 | 45 | — | — | 51 | 25 | 75 | 30 | 20 | Sulfur | 3 | TBZTD | 1 |
| Example 36 | EPDM | Esplene301A | 17 | 44 | — | — | 50 | 22 | 78 | 30 | 20 | Sulfur | 3 | TT | 3 |
| Example 37 | EPDM | Esplene301A | 17 | 44 | — | — | 50 | 22 | 78 | 30 | 20 | Sulfur | 3 | TT | 3 |
| Example 38 | EPDM | Esplene301A | 17 | 44 | — | — | 51 | 22 | 78 | 30 | 20 | Sulfur | 3 | TT | 3 |

TABLE 5B-1

| Rubber material | | | | |
|---|---|---|---|---|
| Material abbreviation | | Material name | Product name | Manufacturer's name |
| Butyl | Butyl065 | Butyl rubber | JSR Butyl 065 | JSR Corporation |

TABLE 5B-1-continued

| Rubber material | | | | |
|---|---|---|---|---|
| Material abbreviation | | Material name | Product name | Manufacturer's name |
| BR | T0700 | Polybutadiene rubber | JSR T0700 | JSR Corporation |

TABLE 5B-1-continued

| Rubber material | | | | |
|---|---|---|---|---|
| Material abbreviation | | Material name | Product name | Manu-facturer's name |
| ECO | CG103 | Epichloro-hydrin rubber | EPICHLOMER CG103 | Osaka soda Co., Ltd. |
| EPDM | Esplene301A | Ethylene propylene diene rubber | Esprene301A | Sumitomo Chemical Company, Limited |
| EPDM | Esplene505A | Ethylene propylene diene rubber | Esprene505A | Sumitomo Chemical Company, Limited |
| NBR | DN401LL | Acrylonitrile butadiene rubber | Nipol DN401LL | Zeon Corporation |
| NBR | N230SV | Acrylonitrile butadiene rubber | NBR N230SV | JSR Corporation |
| NBR | N230S | Acrylonitrile butadiene rubber | NBR N230S | JSR Corporation |
| NBR | N202S | Acrylonitrile butadiene rubber | NBR N202S | JSR Corporation |
| SBR | T2003 | Styrene butadiene rubber | TUFDENE 2003 | Asahi Kasei Corporation |
| SBR | T1000 | Styrene butadiene rubber | TUFDENE 1000 | Asahi Kasei Corporation |
| SBR | T2100 | Styrene butadiene rubber | TUFDENE 2100 | Asahi Kasei Corporation |
| SBR | A303 | Styrene butadiene rubber | ASAPRENE 303 | Asahi Kasei Corporation |

TABLE 5B-2

| Electroconductive agent | | | |
|---|---|---|---|
| Material abbreviation | Material name | Product name | Manufacturer's name |
| #7360 | Electroconductive carbon black | TOKABLACK #7360 SB | Tokai Carbon Co., Ltd. |
| #5500 | Electroconductive carbon black | TOKABLACK #5500 | Tokai Carbon Co., Ltd. |
| Ketjen | Electroconductive carbon black | CARBRON ECP | LION SPECIALTY CHEMICALS CO., Ltd. |
| LV | Ionin electroconductive agent | LV70 | ADEKA |

TABLE 5B-3

| Vulcanizing agent and a Vulcanization accelerator | | | |
|---|---|---|---|
| Material abbreviation | Material name | Product name | Manufacturer's name |
| Sulfur | Sulfur | SULFAX PMC | Tsurumi Chemical Industry Co., Ltd. |
| TT | Tetramethyl thiuram disulfide | NOCCELER TT-P | Ouchi Shinko Chemical Industrial Co., Ltd |
| TBZTD | Tetrabenzyl thiuram disulfide | SANCELER TBZTD | Sanshin Chemical Industry Co., Ltd. |
| TET | Tetraethyl thiuram disulfide | SANCELER TET-G | Sanshin Chemical Industry Co., Ltd. |

TABLE 6-1

| | | | | | Evaluation of characteristics of matrix domain configuration | | | | |
|---|---|---|---|---|---|---|---|---|---|
| | | | | | Matrix | | | | |
| | | Impedance characteristics | | | | | | Domain | |
| | | Electroconductive layer | | | | | | | |
| | Presence of sea-island structure | (a) Slope a. u. | (b) Impedance Ω | Electro-conductive support Impedance Ω | Volume resistivity Ωcm | Inter-domain surface distances μm | Uniformity of inter-domain surface distances σm/Dm — | Volume resistivity Ωcm | Volume resistivity uniformity σr/μr — |
| Example 1 | Presence | −0.32 | 1.52E+03 | 9.08E−03 | 7.13E+16 | 0.21 | 0.25 | 2.59E+01 | 0.15 |
| Example 2 | Presence | −0.33 | 1.08E+03 | 5.95E−03 | 5.22E+16 | 0.25 | 0.22 | 1.15E+01 | 0.12 |
| Example 3 | Presence | −0.33 | 1.55E+03 | 3.32E−03 | 3.04E+16 | 0.45 | 0.21 | 2.73E+01 | 0.13 |
| Example 4 | Presence | −0.38 | 2.54E+03 | 8.27E−03 | 8.16E+16 | 0.85 | 0.23 | 8.69E+01 | 0.15 |
| Example 5 | Presence | −0.42 | 3.87E+03 | 6.80E−03 | 6.62E+16 | 1.15 | 0.25 | 7.62E+00 | 0.18 |
| Example 6 | Presence | −0.35 | 1.54E+03 | 7.98E−03 | 9.58E+15 | 0.23 | 0.22 | 4.43E+01 | 0.12 |
| Example 7 | Presence | −0.32 | 4.01E+03 | 7.99E−03 | 1.47E+14 | 0.24 | 0.24 | 2.56E+01 | 0.18 |
| Example 8 | Presence | −0.31 | 6.58E+03 | 3.88E−03 | 4.69E+13 | 0.22 | 0.21 | 7.69E+01 | 0.20 |
| Example 9 | Presence | −0.3 | 1.98E+04 | 4.24E−03 | 9.02E+12 | 0.21 | 0.20 | 6.91E+01 | 0.18 |
| Example 10 | Presence | −0.38 | 3.32E+04 | 3.66E−03 | 7.97E+15 | 0.25 | 0.25 | 9.61E+01 | 0.11 |
| Example 11 | Presence | −0.42 | 1.02E+05 | 6.52E−03 | 2.21E+15 | 0.23 | 0.25 | 7.93E+03 | 0.13 |
| Example 12 | Presence | −0.36 | 2.39E+03 | 9.23E−03 | 8.39E+14 | 0.23 | 0.23 | 1.27E+01 | 0.15 |
| Example 13 | Presence | −0.36 | 9.73E+03 | 3.57E−03 | 1.64E+14 | 0.55 | 0.21 | 5.88E+01 | 0.18 |
| Example 14 | Presence | −0.41 | 1.26E+04 | 5.48E−03 | 8.21E+15 | 0.91 | 0.22 | 1.38E+01 | 0.12 |
| Example 15 | Presence | −0.52 | 6.13E+04 | 1.42E−04 | 6.42E+15 | 1.92 | 0.23 | 5.02E+00 | 0.13 |
| Example 16 | Presence | −0.55 | 9.05E+03 | 5.15E−04 | 3.22E+14 | 0.24 | 0.24 | 2.55E+01 | 0.14 |
| Example 17 | Presence | −0.62 | 1.27E+04 | 3.66E−04 | 2.11E+12 | 0.45 | 0.26 | 3.22E+01 | 0.14 |
| Example 18 | Presence | −0.51 | 7.63E+04 | 9.33E−03 | 2.54E+15 | 0.22 | 0.24 | 1.18E+01 | 0.14 |
| Example 19 | Presence | −0.5 | 9.96E+05 | 1.97E−03 | 6.40E+15 | 0.21 | 0.20 | 4.19E+03 | 0.15 |

TABLE 6-1-continued

| | | | | | | | | | |
|---|---|---|---|---|---|---|---|---|---|
| Example 20 | Presence | −0.54 | 7.82E+05 | 6.37E−03 | 9.86E+15 | 0.23 | 0.21 | 5.94E+01 | 0.11 |
| Example 21 | Presence | −0.68 | 7.64E+05 | 9.96E−03 | 5.00E+15 | 0.24 | 0.21 | 9.41E+03 | 0.13 |

| | Evaluation of characteristics of matrix domain configuration | | | | | | | |
|---|---|---|---|---|---|---|---|---|
| | Domain | | | | | | Image evaluation | |
| | Equivalent circle diameter D μm | Particle size distribution σd/D — | Electronic electro-conductive material cross-sectional area ratio μr % | Perimeter ratio A/B — | Shape index Number % | Domain volume fraction % | Black and white potential difference V | Ghost image — |
| Example 1 | 0.22 | 0.26 | 26.8 | 1.09 | 82 | 14.0 | 1 | A |
| Example 2 | 0.23 | 0.24 | 28.0 | 1.04 | 89 | 13.6 | 1 | A |
| Example 3 | 0.44 | 0.22 | 26.2 | 1.04 | 89 | 18.9 | 2 | A |
| Example 4 | 0.51 | 0.23 | 27.0 | 1.07 | 88 | 20.6 | 10 | A |
| Example 5 | 0.81 | 0.21 | 26.2 | 1.07 | 84 | 23.4 | 15 | A |
| Example 6 | 0.23 | 0.24 | 26.1 | 1.04 | 81 | 18.2 | 2 | A |
| Example 7 | 0.21 | 0.21 | 27.4 | 1.06 | 80 | 18.8 | 3 | A |
| Example 8 | 0.21 | 0.22 | 27.9 | 1.01 | 82 | 18.6 | 10 | A |
| Example 9 | 0.25 | 0.20 | 27.2 | 1.08 | 85 | 18.5 | 15 | A |
| Example 10 | 0.25 | 0.20 | 26.2 | 1.06 | 94 | 18.8 | 20 | A |
| Example 11 | 0.24 | 0.20 | 25.7 | 1.06 | 82 | 19.1 | 24 | A |
| Example 12 | 1.11 | 0.24 | 26.1 | 1.03 | 83 | 20.8 | 7 | A |
| Example 13 | 1.33 | 0.23 | 26.1 | 1.09 | 84 | 20.7 | 13 | A |
| Example 14 | 1.52 | 0.21 | 26.3 | 1.03 | 90 | 20.6 | 20 | A |
| Example 15 | 1.66 | 0.19 | 26.3 | 1.02 | 84 | 20.4 | 23 | A |
| Example 16 | 1.55 | 0.20 | 26.6 | 1.07 | 89 | 20.9 | 10 | A |
| Example 17 | 1.99 | 0.23 | 26.4 | 1.07 | 84 | 21.1 | 15 | A |
| Example 18 | 2.55 | 0.20 | 25.9 | 1.09 | 85 | 20.2 | 30 | B |
| Example 19 | 2.38 | 0.25 | 24.6 | 1.10 | 91 | 20.4 | 35 | B |
| Example 20 | 4.8 | 0.26 | 26.5 | 1.08 | 90 | 22.8 | 28 | B |
| Example 21 | 4.9 | 0.23 | 24.1 | 1.04 | 84 | 23.1 | 36 | B |

TABLE 6-2

| | | | | | Evaluation of characteristics of matrix domain configuration | | | | |
|---|---|---|---|---|---|---|---|---|---|
| | | Impedance characteristics | | | Matrix | | | Domain | |
| | | Electroconductive layer | | | | | | | |
| | Presence of sea-island structure | (a) Slope a. u. | (b) Impedance Ω | Electro-conductive support Impedance Ω | Volume resistivity Ωcm | Inter-domain surface distances μm | Uniformity of inter-domain surface distances σm/Dm — | Volume resistivity Ωcm | Volume resistivity uniformity σr/μr — |
| Example 22 | Presence | −0.63 | 8.78E+04 | 3.17E−03 | 5.92E+12 | 0.26 | 0.22 | 6.99E+01 | 0.17 |
| Example 23 | Presence | −0.72 | 2.19E+06 | 9.54E−03 | 9.80E+12 | 0.23 | 0.23 | 8.93E+03 | 0.11 |
| Example 24 | Presence | −0.79 | 9.45E+04 | 1.71E−03 | 8.08E+15 | 0.21 | 0.23 | 7.03E+01 | 0.15 |
| Example 25 | Presence | −0.48 | 2.28E+04 | 4.50E−03 | 2.95E+15 | 2.9 | 0.26 | 1.03E+01 | 0.14 |
| Example 26 | Presence | −0.68 | 2.13E+05 | 5.29E−04 | 2.55E+12 | 3.2 | 0.24 | 6.55E+03 | 0.20 |
| Example 27 | Presence | −0.66 | 5.27E+05 | 3.33E−04 | 3.55E+15 | 3.1 | 0.24 | 9.11E+03 | 0.15 |
| Example 28 | Presence | −0.58 | 2.00E+05 | 9.26E−03 | 6.19E+12 | 3.1 | 0.22 | 9.36E+03 | 0.13 |
| Example 29 | Presence | −0.71 | 9.60E+04 | 6.96E−03 | 6.27E+15 | 5.6 | 0.20 | 5.76E+01 | 0.15 |
| Example 30 | Presence | −0.75 | 9.08E+04 | 5.69E−03 | 5.55E+12 | 5.5 | 0.23 | 2.55E+01 | 0.15 |
| Example 31 | Presence | −0.55 | 2.96E+05 | 6.66E−03 | 6.35E+12 | 5.2 | 0.22 | 5.68E+03 | 0.14 |
| Example 32 | Presence | −0.79 | 5.96E+05 | 6.86E−03 | 5.64E+12 | 5.4 | 0.20 | 9.00E+03 | 0.17 |
| Example 33 | Presence | −0.72 | 7.56E+06 | 2.50E−03 | 2.22E+15 | 0.53 | 0.52 | 2.55E+01 | 0.13 |
| Example 34 | Presence | −0.75 | 8.99E+06 | 2.20E−03 | 3.55E+15 | 0.57 | 0.21 | 2.22E+01 | 0.60 |
| Example 35 | Presence | −0.79 | 9.22E+05 | 3.66E−03 | 3.56E+15 | 0.45 | 0.35 | 4.55E+01 | 0.15 |
| Example 36 | Presence | −0.47 | 1.39E+06 | 1.50E+02 | 2.46E+16 | 0.23 | 0.23 | 2.88E+01 | 0.13 |
| Example 37 | Presence | −0.48 | 1.75E+06 | 1.00E+01 | 1.62E+16 | 0.22 | 0.23 | 6.40E+01 | 0.13 |
| Example 38 | Presence | −0.58 | 1.56E+06 | 2.00E+02 | 3.12E+16 | 0.25 | 0.23 | 8.40E+01 | 0.11 |

TABLE 6-2-continued

| | Evaluation of characteristics of matrix domain configuration | | | | | | | |
|---|---|---|---|---|---|---|---|---|
| | Domain | | | | | | Image evaluation | |
| | Equivalent circle diameter D μm | Particle size distribution σd/D — | Electronic electro-conductive material cross-sectional area ratio μr % | Perimeter ratio A/B — | Shape index Number % | Domain volume fraction % | Black and white potential difference V | Ghost image — |
| Example 22 | 4.4 | 0.25 | 26.6 | 1.10 | 86 | 23.8 | 36 | B |
| Example 23 | 4.6 | 0.24 | 20.6 | 1.04 | 89 | 24.1 | 40 | C |
| Example 24 | 5.7 | 0.23 | 26.5 | 1.09 | 86 | 23.2 | 45 | C |
| Example 25 | 0.23 | 0.22 | 26.2 | 1.05 | 90 | 14.3 | 25 | B |
| Example 26 | 1.34 | 0.21 | 26.4 | 1.05 | 90 | 13.9 | 26 | B |
| Example 27 | 1.11 | 0.20 | 20.7 | 1.02 | 83 | 13.5 | 27 | B |
| Example 28 | 0.22 | 0.22 | 20.5 | 1.01 | 87 | 13.2 | 28 | B |
| Example 29 | 4.93 | 0.22 | 26.3 | 1.08 | 95 | 22.6 | 40 | C |
| Example 30 | 4.85 | 0.22 | 26.3 | 1.05 | 91 | 23.8 | 48 | C |
| Example 31 | 4.36 | 0.21 | 21.8 | 1.04 | 82 | 23.2 | 42 | C |
| Example 32 | 4.42 | 0.23 | 21.0 | 1.08 | 92 | 23.8 | 48 | C |
| Example 33 | 2.3 | 0.55 | 26.9 | 1.06 | 88 | 23.4 | 41 | C |
| Example 34 | 1.57 | 0.23 | 26.9 | 1.06 | 85 | 23.0 | 42 | C |
| Example 35 | 1.23 | 0.31 | 20.6 | 1.20 | 56 | 23.7 | 45 | C |
| Example 36 | 1.15 | 0.23 | 26.6 | 1.04 | 94 | 14.1 | 35 | B |
| Example 37 | 1.26 | 0.21 | 26.2 | 1.03 | 87 | 13.9 | 31 | B |
| Example 38 | 1.33 | 0.21 | 26.8 | 1.06 | 81 | 13.8 | 40 | C |

Example 39

An electroconductive roller B1 was manufactured in the same manner as in Example 1 except that the diameter of the electroconductive support was changed to 5 mm and the outer diameter of the electroconductive member after polishing was 10.0 mm.

The electroconductive roller B1 was used as a transfer member for the following evaluations.

As an electrophotographic apparatus, an electrophotographic laser printer (product name: Laserjet M608dn, available from HP) was prepared.

First, the electroconductive roller B1 and the laser printer were left in an environment of 23° C. and 50% for 48 hours for the purpose of adjusting to the measurement environment.

Next, the electroconductive roller B1 was incorporated into the laser printer as a transfer member. In order to evaluate in a high-speed process, the laser printer was modified so that the number of output sheets per unit time was 75 sheets/minute with A4 size paper, which was larger than the number of original output sheets. At that time, the output speed of the recording medium was 370 mm/sec and the image resolution was 1,200 dpi. Also, it was left in an environment of 23° C. and 50% for 48 hours.

The electrophotographic apparatus was modified so as to measure the surface potential of the back surface, of the recording medium A4 size paper, opposite to the surface on which the developer was transferred. A surface electrometer and a probe for measuring the surface potential used were the same as those used in the examples of the charging roller.

As a result of evaluating the difference in the surface potential between the portion with the developer and the back surface, of the A4 size paper without the developer, which is opposite to the surface on which the developer is transferred, the difference was 5 V.

COMPARATIVE EXAMPLE

Comparative Example 1

An electroconductive member C1 was manufactured in the same manner as in Example 1 except that the materials and conditions indicated in Table 8-1 and Table 8-2 were used. Then, according to the following method, an electroconductive resin layer was further provided on the electroconductive support C1 to manufacture an electroconductive roller C1, and the same measurement and evaluation as in Example 1 were performed. The results are indicated in Table 9.

First, methyl isobutyl ketone as a solvent was added to a caprolactone-modified acrylic polyol solution to adjust the solid content to 10% by mass. With respect to 1,000 parts by mass of this acrylic polyol solution (100 parts by mass of solid content), a mixed solution was prepared using the materials indicated in Table 7 below. At this time, the mixture of block HDI and block IPDI had “NCO/OH=1.0”.

TABLE 7

| | Raw material name | Blending amount (Parts by mass) |
|---|---|---|
| Main agent | Caprolactone modified acrylic polyol solution (Solid content: 70% by mass) (Product name: PLACCEL DC2016, available from Daicel Corporation) | 100 (Solid content) |
| Curing agent 1 | Blocked isocyanate A (IPDI, Solid content: 60% by mass) (Product name: VESTANAT B1370, available from Evonik) | 37 (Solid content) |

TABLE 7-continued

| | Raw material name | Blending amount (Parts by mass) |
|---|---|---|
| Curing agent 2 | Blocked isocyanate B (HDI, Solid content 80% by mass) (Product name: DURANATE TPA-B80E, available from Asahi Kasei Chemicals Corporation) | 24 (Solid content) |
| Electroconductive agent | Carbon black (HAF) (Product name: Seast3, available from Tokai Carbon Co., Ltd.) | 15 |
| Additive 1 | Needle-shaped rutile titanium oxide fine particles (Product name: MT-100T, available from Teika) | 35 |
| Additive 2 | Modified dimethyl silicone oil (Product name: SH28PA, available from Toray Dow Corning Silicone) | 0.1 |

Then, 210 g of the above mixed solution, 200 g of glass beads having an average particle diameter of 0.8 mm as a medium were mixed in a 450 mL glass bottle, and predispersed for 24 hours using a paint shaker disperser, thereby obtaining a paint for forming an electroconductive resin layer.

The electroconductive support C011 was dipped into the paint for forming the electroconductive resin layer with the longitudinal direction being the vertical direction, and applied by a dipping method. The dipping time for dip-coating was nine seconds, the initial pull-up speed was 20 mm/sec, the final pull-up speed was 2 mm/sec, and during that time, the speed was changed linearly with time. The obtained coated product was air-dried at room temperature for 30 minutes, then dried for one hour in a hot air circulation dryer set at 90° C., and further dried for one hour in the hot air circulation dryer set at 160° C. so as to obtain an electroconductive roller C1. The evaluation results are indicated in Table 9.

In this comparative example, the electroconductive layer has only a single layer made of an electroconductive material, and thus has a single electroconductive path as an electroconductive member. Therefore, the slope of the impedance was −1 in the high frequency region, and the ghost image was rank D.

Comparative Example 2

An electroconductive member C2 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, the electroconductive layer has only a single layer made of an electroconductive material, and thus has a single electroconductive path as an electroconductive member. Therefore, the slope of the impedance was −1 in the high frequency region, and the ghost image was rank D.

Comparative Example 3

An electroconductive member C3 was manufactured in the same manner as in Example 1 except that the materials and conditions indicated in Table 8-1 and Table 8-2 were used, and the same measurements and evaluations as in Example 1 were performed.

The results are indicated in Table 9.

In this comparative example, although the domains and the matrix are included, the matrix is an ionic electroconductive base layer, so that the matrix eventually has a single electroconductive path as an electroconductive member. Therefore, the slope of the impedance was −1 in the high frequency region, and the ghost image was rank D.

Comparative Example 4

An electroconductive member C4 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, the volume resistivity of the matrix is low, and the electroconductive member has a single electroconductive path. Therefore, the slope of the impedance was −1 in the high frequency region, and the ghost image was rank D.

Comparative Example 5

An electroconductive member C5 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, although the matrix-domain structure is used, the volume resistivity of the matrix is low, the movement of electric charges cannot be limited to the domains, the state of leaking to the matrix is reduced, and the easiness of discharge is reduced. Therefore, the impedance in the low frequency region increased and the ghost image was rank D.

Comparative Example 6

An electroconductive member C6 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, although the matrix-domain structure is used, the volume resistivity of the domain is high and the resistance of the matrix is low, and the electroconductive member has a single continuous electroconductive path. Therefore, the slope of the impedance was −1 in the high frequency region, and the ghost image was rank D.

Comparative Example 7

An electroconductive member C7 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, the electroconductive phase and the insulating phase have a bicontinuous structure instead of the matrix-domain structure. That is, the electroconductive member has a single electroconductive path.

Therefore, the slope of the impedance was −1 in the high frequency region, and the ghost image was rank D.

Comparative Example 8

An electroconductive member C8 was manufactured in the same manner as in Example 1 except that the materials and conditions indicated in Table 8-1 and Table 8-2 were used, and the same measurements and evaluations as in Example 1 were performed. The results are indicated in Table 9.

In this comparative example, as the electroconductive member, the impedance value on the low frequency side was high, charging was insufficient, image output was not possible, and therefore, evaluation was impossible.

TABLE 8-1

| | Electroconductive support | | Unvulcanized domain rubber composition | | | | | | | | |
|---|---|---|---|---|---|---|---|---|---|---|---|
| | | | Raw material rubber type | | | | Electroconductive agent | | | Dispersion | |
| | Type | Electroconductive surface | Material | abbreviation | SP value | Mooney viscosity | Type | Parts by mass | DBP | time min | Mooney viscosity |
| Comparative Example 1 | SUS | Ni plating | NBR | N230SV | 19.2 | 32 | LV | 3 | — | 30 | 35 |
| Comparative Example 2 | SUS | Ni plating | NBR | N230SV | 19.2 | 32 | #7360 | 50 | 87 | 30 | 60 |
| Comparative Example 3 | SUS | Ni plating | NBR | N230SV | 19.2 | 32 | Ketjen | 10 | 360 | 30 | 50 |
| Comparative Example 4 | SUS | Ni plating | NBR | N230SV | 19.2 | 32 | #7360 | 60 | 87 | 30 | 65 |
| Comparative Example 5 | SUS | Ni plating | BR | JSR T0700 | 17.1 | 43 | #7360 | 80 | 87 | 30 | 85 |
| Comparative Example 6 | SUS | Ni plating | SBR | T2003 | 17 | 45 | — | — | — | — | 45 |
| Comparative Example 7 | SUS | Ni plating | BR | JSR T0700 | 17.1 | 43 | #7360 | 80 | 87 | 30 | 85 |
| Comparative Example 8 | SUS | Ni plating | BR | JSR T0700 | 17.1 | 43 | #7360 | 80 | 87 | 30 | 85 |

TABLE 8-2

| | Unvulcanized matrix rubber composition | | | | | | | Unvulcanized rubber composition | | Unvulcanized rubber dispersion | | Vulcanizing agent | | Vulcanization accelerator | |
|---|---|---|---|---|---|---|---|---|---|---|---|---|---|---|---|
| | Rubber type | | | | Filler | | | Domain | Matrix | Rotation | Kneading | | | | |
| | Material | abbreviation | SP value | Mooney viscosity | Material abbreviation | Parts by mass | Mooney viscosity | Parts by mass | Parts by mass | speed rpm | time min | Material abbreviation | Parts by mass | Material abbreviation | Parts by mass |
| Comparative Example 1 | — | — | — | — | — | — | — | 100 | 0 | — | — | Sulfur | 3 | TBZTD | 1 |
| Comparative Example 2 | — | — | — | — | — | — | — | 100 | 0 | — | — | Sulfur | 3 | TBZTD | 1 |
| Comparative Example 3 | ECO | CG103 | 18.5 | 64 | LV | 3 | 72 | 20 | 80 | 30 | 20 | Sulfur | 3 | TBZTD | 1 |
| Comparative Example 4 | SBR | T2003 | 17 | 55 | #7360 | 20 | 60 | 25 | 75 | 30 | 20 | Sulfur | 3 | TBZTD | 1 |
| Comparative Example 5 | NBR | N2305V | 19.2 | 32 | — | — | 37 | 25 | 75 | 30 | 20 | Sulfur | 3 | TBZTD | 1 |
| Comparative Example 6 | NBR | N2305V | 19.2 | 65 | #7360 | 60 | 74 | 75 | 25 | 30 | 20 | Sulfur | 3 | TBZTD | 1 |
| Comparative Example 7 | EPDM | Esplene505A | 16 | 47 | — | — | 53 | 60 | 40 | 30 | 20 | Sulfur | 3 | TET | 3 |
| Comparative Example 8 | EPDM | Esplene505A | 16 | 47 | — | — | 56 | 10 | 90 | 30 | 20 | Sulfur | 3 | TET | 3 |

Comparative Example 9

[Manufacture of Unvulcanized Rubber Mixture for Forming Domain (CMB)]

The materials indicated in Table 8-3 were mixed in the blending amounts indicated in Table 8-3. The mixing conditions were the same as for CMB in Example 1.

TABLE 8-3

| | Raw material name | Blending amount (Parts by mass) |
|---|---|---|
| Raw material rubber | Butadiene rubber (Product name: JSR T0700, available from JSR Corporation Mooney viscosity ML(1 + 4)100° C.: 43 SP value: 17.1 $(J/cm^3)^{0.5}$) | 100 |
| Electronic electroconductive agent | Carbon black (Product name: TOKABLACK #7360, available from Tokai Carbon Co., Ltd.) DBP oil absorption: 87 $cm^3$/100 g pH: 7.5) | 85 |
| Vulcanization accelerator | Zinc oxide (Product name: Zinc oxide, available from Sakai Chemical Industry Co., Ltd.) | 5 |
| Processing aid | Zinc stearate (Product name: SZ-2000), available from Sakai Chemical Industry Co., Ltd.) | 2 |

Each material indicated in Table 8-4 was added to 100 parts by mass of the CMB obtained above in the blending amount indicated in Table 8-4, and mixed under the same mixing conditions at the time of preparing the rubber mixture for forming an electroconductive layer of Example 1 so as to prepare CMB.

TABLE 8-4

| | Raw material name | Blending amount (Parts by mass) |
|---|---|---|
| Vulcanizing agent | Sulfur (Product name: SULFAX PMC, available from Tsurumi Chemical Industry Co., Ltd.) | 3 |
| Vulcanization aid | Tetraethyl thiuram disulfide (Product name: NOCCELER TET-G, available from Ouchi Shinko Chemical Industrial Co., Ltd) | 3 |

[Preparation of Rubber Particles for Domain Molding]

The obtained CMB was placed in a mold having a thickness of 2 mm and vulcanized by a hot press at a pressure of 10 MPa and a temperature of 160° C. for 30 minutes. The rubber sheet was taken out from the mold and cooled to room temperature to obtain a vulcanized rubber sheet of the rubber composition for molding a domain having a thickness of 2 mm.

The obtained vulcanized rubber sheet was dipped in liquid nitrogen for 48 hours, completely frozen, and then crushed with a hammer to form coarse powder. Thereafter, using a collision type supersonic jet crusher (product name: CPY+USF-TYPE, available from Nippon Pneumatic Mfg. Co., Ltd.), freeze pulverization and classification were simultaneously performed to obtain vulcanized rubber particles for forming a domain.

[Preparation of Rubber Mixture for Forming Matrix (MRC)]

Each material indicated in Table 8-5 was mixed in the blending amount indicated in Table 8-5, and mixed under the same mixing conditions as in the preparation of MRC in Example 1 so as to obtain MRC.

TABLE 8-5

| | Raw material name | Blending amount (Parts by mass) |
|---|---|---|
| Raw material rubber | EPDM (Product name: Esplene505A, available from Sumitomo Chemical Company, Limited Mooney viscosity ML(1 + 4)100° C.: 47 SP VALUE: 16.0 $(J/cm^3)^{0.5}$)) | 100 |
| Filler | Calcium carbonate (Product name: NANOX #30, available from Marua Calcium Co., Ltd.) | 70 |
| Vulcanization accelerator | Zinc oxide (Product name: Zinc oxide, available from Sakai Chemical Industry Co., Ltd.) | 7 |
| Processing aid | Zinc stearate (Product name: SZ-2000, available from Sakai Chemical Industry Co., Ltd.) | 2.8 |

[Preparation of Rubber Mixture for Forming Electroconductive Layer]

The vulcanized rubber particles for forming a domain obtained above and MRC were mixed in the blending amount indicated in Table 8-6 so as to obtain an unvulcanized rubber mixture. A 6-liter pressure kneader (product name: TD6-15MDX, available from Toshin) was used as a mixer. The mixing conditions were a filling rate of 70 vol %, a blade rotation speed of 30 rpm, and 16 minutes of time duration.

TABLE 8-6

| Raw material for unvulcanized rubber composition | | |
|---|---|---|
| | Raw material name | Blending amount (Parts by mass) |
| Raw material rubber | Rubber particle for domain molding | 25 |
| Raw material rubber | MRC | 75 |

Each material indicated in Table 8-7 was added to 100 parts by mass of the unvulcanized rubber mixture obtained above in the blending amount indicated in Table 8-7, and mixed under the same mixing methods at the time of preparing the rubber mixture for forming an electroconductive layer of Example 1 so as to prepare a rubber mixture for forming an electroconductive layer.

TABLE 8-7

| Raw material of rubber composition for forming electroconductive member | | |
|---|---|---|
| | Raw material name | Blending amount (Parts by mass) |
| Vulcanizing agent | Sulfur (Product name: SULFAX PMC, available from Tsurumi Chemical Industry Co., Ltd.) | 3 |
| Vulcanization aid | Tetraethyl thiuram disulfide (Product name: NOCCELER TET-G, available from Ouchi Shinko Chemical Industrial Co., Ltd) | 3 |

An electroconductive roller C9 was manufactured in the same manner as in Example 1 except that the rubber mixture for forming an electroconductive layer was used, and the same measurements and evaluations as in Example 1 were performed. The results are indicated in Table 9.

In this comparative example, since the anisotropic electroconductive rubber particles formed by freeze pulverization, which are large in size, are dispersed, the electroconductive paths in the electroconductive member are unevenly formed, which is synonymous with the state where the thickness of the domain is large. As a result, the slope of the impedance was −1 at a high frequency, and the ghost image was rank D.

Comparative Example 10

[Preparation of Unvulcanized Hydrin Rubber Composition]

Each material as indicated in Table 8-8 was kneaded under the same conditions as in the preparation of the unvulcanized domain rubber composition of Example 1 so as to prepare an unvulcanized hydrin rubber composition.

TABLE 8-8

| Raw material for unvulcanized hydrin rubber composition | | |
|---|---|---|
| | Raw material name | Blending amount (Parts by mass) |
| Raw material rubber | Epichlorohydrin rubber (EO-EP-AGE ternary co-compound) (Product name: EPICHLOMER CG103, available from Osaka Soda Co., Ltd. SP value: 18.5 $(J/cm^3)^{0.5}$) | 100 |
| Ionic electroconductive agent | LV-70 (Product name: ADK CIZER LV70, available from ADEKA) | 3 |
| Plasticizer | Aliphatic polyester plasticizer (Product name: POLYCIZER P-202, available from DIC) | 10 |
| Filler | Calcium carbonate (Product name: NANOX #30, available from Maruo Calcium Co., Ltd.) | 60 |
| Vulcanization accelerator | Zinc oxide (Product name: Zinc oxide, available from Sakai Chemical Industry Co., Ltd.) | 5 |
| Processing aid | Zinc stearate (Product name: SZ-2000), available from Sakai Chemical Industry Co., Ltd.) | 1 |

Then, each material as indicated in Table 8-9 was kneaded under the same conditions as in the preparation of the rubber composition for forming an electroconductive member of Example 1 so as to prepare a hydrin rubber composition for a first electroconductive elastic layer.

TABLE 8-9

| Hydrin rubber composition for forming electroconductive member | | |
|---|---|---|
| | Raw material name | Blending amount (Parts by mass) |
| Raw material rubber | Unvulcanized hydrin rubber composition | 100 |
| Vulcanizing agent | Sulfur (Product name: SULFAX PMC, available from Tsurumi Chemical Industry Co., Ltd.) | 1.8 |
| Vulcanization aid 1 | Tetramethyl thiuram monosulfide (Product name: NOCCELER TS, available from Ouchi Shinko Chemical Industrial Co., Ltd) | 1 |
| Vulcanization aid 2 | 2-Mercaptobenzimidazole (Product name: NOCRAC MB, available from Ouchi Shinko Chemical Industrial Co., Ltd) | 1 |

Next, the rubber composition for molding an electroconductive member of Example 1 was prepared for a second electroconductive elastic layer.

Figure 16:
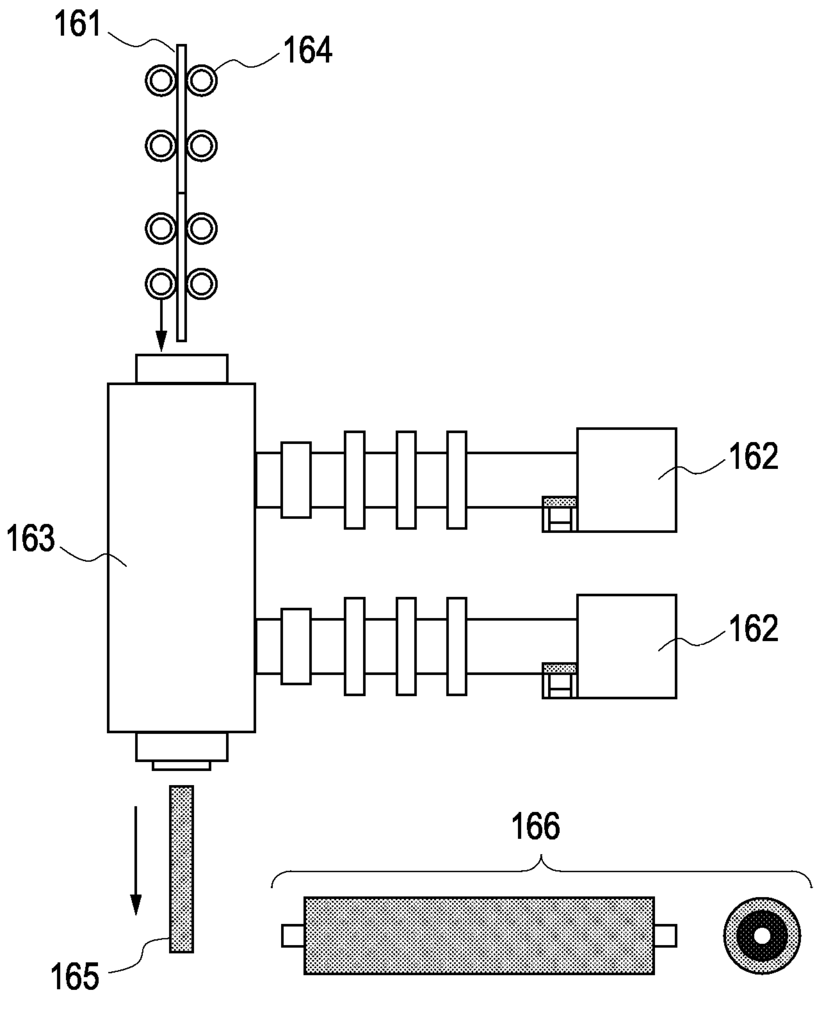
FIG. 16 is an explanatory diagram of a method for manufacturing an electroconductive member.

In order to mold the prepared hydrin rubber composition and the rubber composition for forming an electroconductive member around an electroconductive shaft core, two-layer extrusion was performed using a two-layer extrusion device as illustrated in FIG. 16. FIG. 16 is a schematic diagram of a two-layer extrusion step. An extruder 162 includes a two-layer crosshead 163. With the two-layer crosshead 163, it is possible to manufacture the electroconductive member 166 in which the second electroconductive elastic layer is laminated on the first electroconductive elastic layer using two types of unvulcanized rubbers. an electroconductive shaft core 161 sent by a core feeding roller 164 rotating in the direction of the arrow is inserted into the two-layer crosshead 163 from behind. An unvulcanized rubber roller 165 whose periphery is covered with two types of unvulcanized rubber layers is obtained by integrally extruding two types of cylindrical unvulcanized rubber layers simultaneously with the electroconductive shaft core 161. The unvulcanized rubber roller 165 thus obtained is vulcanized using a hot air circulating furnace or an infrared drying furnace. Then, the vulcanized rubber at both ends of the electroconductive layer is removed to obtain the electroconductive member 166.

The temperature of the two-layer crosshead was adjusted to 100 degrees and the outer diameter of an extrudate after extrusion was adjusted to 9 mm. Next, an electroconductive shaft core was prepared and extruded together with the raw material rubber to simultaneously form two cylindrical raw material rubber layers around the core metal to obtain an unvulcanized rubber roller. Then, the unvulcanized rubber roller was put into a hot air vulcanizing furnace at 160° C. and heated for one hour, and two-layer elastic roller having a hydrin base layer (first electroconductive elastic layer) on the outer peripheral portion of the support and a surface layer (second electroconductive elastic layer) having a matrix-domain structure on the outer peripheral portion thereof was obtained. The thickness ratio of the base layer and the surface layer and the overall outer diameter were adjusted during extrusion so that the thickness of the surface layer was 1.0 mm. After that, both ends of the electroconductive layer were cut off by 10 mm to set a length of an electroconductive layer portion in the longitudinal direction to be 231 mm.

Finally, the surface of the electroconductive layer was polished with a rotary grindstone. As a result, an electroconductive member C10 was manufactured as an electroconductive roller having a crown shape with a diameter of 8.4 mm at a position of 90 mm from the central portion to both end sides and a central portion diameter of 8.5 mm, and the same measurements and evaluations as in Example 1 were performed. The results are indicated in Table 9. In this comparative example, a thin layer having a matrix-domain structure is formed on the outer periphery of an ionic electroconductive base layer having a medium resistance. Therefore, since the slope of the impedance is governed by the characteristics of the ionic electroconductive base layer in the high frequency region, the slope of the impedance was −1 at a high frequency, and the ghost image was rank D.

TABLE 9

| | | Impedance characteristics | | | Evaluation of characteristics of matrix domain configuration | | | | |
|---|---|---|---|---|---|---|---|---|---|
| | | Electroconductive layer | | | Matrix | | | Domain | |
| | Presence of sea-island structure | (a) Slope a.u. | (b) Impedance Ω | Electroconductive support Impedance Ω | Volume resistivity Ωcm | Inter-domain surface distances μm | Uniformity of inter-domain surface distances σm/Dm — | Volume resistivity Ωcm | Volume resistivity uniformity σr/μr — |
| Comparative Example 1 | Absence | −1 | 2.56E+08 | 8.79E−03 | — | — | — | — | — |
| Comparative Example 2 | Absence | −1 | 6.22E+07 | 9.51E−03 | — | — | — | — | — |
| Comparative Example 3 | Presence | −1 | 5.12E+08 | 5.60E−03 | 1.44E+07 | 0.56 | 0.32 | 1.25E+01 | 0.15 |
| Comparative Example 4 | Presence | −1 | 6.15E+06 | 5.20E−03 | 1.87E+07 | 0.21 | 0.25 | 2.55E+01 | 0.14 |
| Comparative Example 5 | Presence | −1 | 1.57E+07 | 6.33E−03 | 2.58E+09 | 0.23 | 0.26 | 5.21E+01 | 0.16 |
| Comparative Example 6 | Presence | −1 | 2.21E+04 | 9.23E−03 | 9.18E+02 | 2.2 | 0.22 | 2.56E+15 | — |
| Comparative Example 7 | Absence | −1 | 1.60.E+05 | 5.50E−03 | — | — | — | — | — |
| Comparative Example 8 | Presence | −0.29 | 3.21E+09 | 1.56E−03 | 6.56E+15 | 0.23 | 0.33 | 2.89E+01 | 0.14 |
| Comparative Example 9 | Presence | −0.97 | 6.97.E+04 | 4.20.E−03 | 9.271E+15 | 18 | 0.55 | 8.3.E+01 | 0.22 |
| Comparative Example 10 | Presence | −1 | 1.50.E+06 | 2.50E+06 | 8.70E+15 | 0.21 | 0.25 | 6.22E+01 | 0.15 |

| | Evaluation of characteristics of matrix domain configuration | | | | | Image evaluation | |
|---|---|---|---|---|---|---|---|
| | Domain | | | | | | |
| | Equivalent circle diameter D μm | Electronic electroconductive material cross-sectional area ratio μr % | Perimeter ratio A/B — | Shape index Number % | Domain volume fraction % | Black and white potential difference V | Ghost image — |
| Comparative Example 1 | — | — | — | — | — | 60 | D |
| Comparative Example 2 | — | — | — | — | — | 62 | D |
| Comparative Example 3 | 1.20 | 15.2 | 1.02 | 55 | 19.7 | 65 | D |
| Comparative Example 4 | 2.20 | 25.1 | 1.05 | 84 | 24.6 | 66 | D |
| Comparative Example 5 | 2.30 | 26.3 | 1.02 | 86 | 24.3 | 62 | D |
| Comparative Example 6 | 2.50 | — | 1.02 | 85 | 75.6 | 60 | D |
| Comparative Example 7 | — | — | — | — | — | 60 | D |
| Comparative Example 8 | 0.25 | 26.3 | 1.03 | 87 | 10.5 | — | D |
| Comparative Example 9 | 12 | 27.8 | 1.30 | 32 | 25.0 | — | D |
| Comparative Example 10 | 0.23 | 26.1 | 1.08 | 82 | 15.3 | 63 | D |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic electroconductive member comprising:

a support having an electroconductive outer surface; and an electroconductive layer on the electroconductive outer surface of the support, the electroconductive layer having a matrix comprising a first rubber, and domains dispersed in the matrix, the domains each comprising a second rubber and an electronic electroconductive agent, wherein assuming that a metal film is provided on the electroconductive outer surface of the electroconductive member, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C. and a humidity of 50% RH, in a double logarithmic plot with a frequency on an abscissa and an impedance on an ordinate, a slope at frequencies of $1.0\times10^{5}$ Hz to $1.0\times10^{6}$ Hz is −0.8 or more and −0.3 or less, and an impedance at frequency of $1.0\times10^{-2}$ Hz to $1.0\times10^{1}$ Hz is $1.0\times10^{3}$ to $1.0\times10^{7}$Ω.

2. The electroconductive member according to claim 1, wherein the electroconductive layer is directly provided on the electroconductive outer surface of the support.

3. The electroconductive member according to claim 1, further comprising an electroconductive resin layer between the electroconductive layer and the electroconductive outer surface of the support, assuming that a metal film is provided on an outer surface of the resin layer, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C. and a humidity of 50% RH, in a double logarithmic plot with a frequency on an abscissa and an impedance on an ordinate, an impedance at $1.0\times10^{-2}$ Hz to $1.0\times10^{1}$ Hz is $1.0\times10^{-5}$ to $1.0\times10^{2}$Ω.

4. The electroconductive member according to claim 1, wherein volume resistivity of the matrix is more than $1.0\times10^{12}$ Ω·cm and $1.0\times10^{17}$ Ω·cm or less.

5. The electroconductive member according to claim 1, wherein an arithmetic average value Dm of a distance between the domains is 0.2 μm or more and 2.0 μm or less.

6. The electroconductive member according to claim 1, wherein the support is a cylindrical support, and the electroconductive layer is provided on an outer peripheral surface of the cylindrical support.

7. The electrophotographic electroconductive member according to claim 6, wherein defining a length of the cylindrical support of the electroconductive layer in the longitudinal direction as L, and defining a thickness of the electroconductive layer as T, and assuming that three cross sections of the electroconductive layer in a thickness direction thereof at a center in the longitudinal direction of the electroconductive layer, and L/4 from both ends of the electroconductive layer toward the center, are obtained, where L represents a length of the electroconductive layer in the longitudinal direction of the cylindrical support, and assuming that at each of the cross sections, three square observation areas each having 15 μm a side, are arbitrary placed in a thickness region from 0.1 T to 0.9 T in depth from the outer surface of the electroconductive layer, where T represents a thickness of the electroconductive layer, among domains observed in each of the nine observation areas, 80% by number or more of the domains satisfy the following requirements (1) and (2):

(1) a ratio of a cross-sectional area of a part containing the electronic electroconductive agent contained in the domain to a cross-sectional area of the domain is 20% or more; and (2) when defining a perimeter of the domain as A, and defining an envelope perimeter of the domain as B, A/B is 1.00 or more and 1.10 or less.

8. The electroconductive member according to claim 1, wherein when defining the arithmetic average value of an equivalent circle diameter of the domain as D and a standard deviation of distribution of the D as σd, a variation coefficient σd/D of the equivalent circle diameter of the domain is 0 or more and 0.4 or less.

9. The electroconductive member according to claim 1, wherein when defining the arithmetic average value of the inter-domain surface distances as Dm and the standard deviation of distribution of Dm as σm, the variation coefficient σm/Dm of the inter-domain surface distances is 0 or more and 0.4 or less.

10. The electroconductive member according to claim 1, wherein when a mean value of ratios of cross-sectional areas of moieties of the electroconductive agent contained in each of the domains appearing in a cross section in the thickness direction of the electroconductive layer to each of cross-sectional areas of the respective domains is defined as μr, a standard deviation of the ratios is defined as σr, a coefficient of variation σr/μr of the ratios of the cross-sectional areas of the moieties of the electroconductive agent is 0 or more and 0.4 or less.

11. The electroconductive member according to claim 1, wherein the electroconductive member is a charging member.

12. The electroconductive member according to claim 1, wherein the electroconductive member is a transfer member.

13. A process cartridge configured to be detachably attachable to a main body of an electrophotographic image forming apparatus, the process cartridge for electrophotography comprising an electroconductive member, the electrophotographic electroconductive member including:

a support having an electroconductive outer surface; and an electroconductive layer on the electroconductive outer surface of the support, the electroconductive layer having a matrix comprising a first rubber, and domains dispersed in the matrix, the domains each comprising a second rubber and an electronic electroconductive agent, wherein assuming that a metal film is provided on the electroconductive outer surface of the electroconductive member, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C.

and a humidity of 50% RH, in a double logarithmic plot with a frequency on an abscissa and an impedance on an ordinate, a slope at frequencies of $1.0\times10^{5}$ Hz to $1.0\times10^{6}$ Hz is −0.8 or more and −0.3 or less, and an impedance at frequency of $1.0\times10^{-2}$ Hz to $1.0\times10^{1}$ Hz is $1.0\times10^{3}$ to $1.0\times10^{7}\Omega$.

14. An electrophotographic image forming apparatus comprising an electroconductive member, the electrophotographic electroconductive member including:

a support having an electroconductive outer surface; and an electroconductive layer on the electroconductive outer surface of the support, the electroconductive layer having a matrix comprising a first rubber, and domains dispersed in the matrix, the domains each comprising a second rubber and an electronic electroconductive agent, wherein assuming that a metal film is provided on the electroconductive outer surface of the electroconductive member, and impedance is measured by applying an AC voltage with an amplitude of 1 V between the electroconductive outer surface of the support and the metal film while varying a frequency between $1.0\times10^{-2}$ Hz to $1.0\times10^{7}$ Hz under an environment of a temperature of 23° C. and a humidity of 50% RH, in a double logarithmic plot with a frequency on an abscissa and an impedance on an ordinate, a slope at frequencies of $1.0\times10^{5}$ Hz to $1.0\times10^{6}$ Hz is −0.8 or more and −0.3 or less, and an impedance at frequency of $1.0\times10^{-2}$ Hz to $1.0\times10^{1}$ Hz is $1.0\times10^{3}$ to $1.0\times10^{7}\Omega$.

* * * * *